United States Patent
Owens et al.

(10) Patent No.: US 6,633,630 B1
(45) Date of Patent: Oct. 14, 2003

(54) SYSTEM FOR INTEGRATED ELECTRONIC COMMUNICATIONS

(75) Inventors: Stephen J. H. Owens, Dublin, OH (US); James Arthur Kitchen, Atlanta, GA (US); David Gregory Smith, Atlanta, GA (US); Leonard A. DeNittis, Atlanta, GA (US); Kyle S. Brown, Santa Rosa, CA (US); Michael S. Finney, Hilliard, OH (US); Thomas Francis Johnson, III, Atlanta, GA (US); Steve Feinstein, Atlanta, GA (US)

(73) Assignee: Cranberry Properties, LLC, Dulles, VA (US)

( * ) Notice: Subject to any disclaimer, the term of this patent is extended or adjusted under 35 U.S.C. 154(b) by 0 days.

(21) Appl. No.: 09/157,818

(22) Filed: Sep. 12, 1998

Related U.S. Application Data

(63) Continuation of application No. 08/665,564, filed on Jun. 18, 1996, now abandoned.

(51) Int. Cl.⁷ ............................................. H04M 11/00
(52) U.S. Cl. ................. 379/93.24; 379/93.15; 379/100.08; 379/100.13; 379/88.14; 379/88.13
(58) Field of Search ............... 379/93.15, 93.24, 379/100.08, 100.13, 88.14, 88.13, 88.15, 88.12, 88.17

(56) References Cited

U.S. PATENT DOCUMENTS

| | | | |
|---|---|---|---|
| 4,837,798 A | 6/1989 | Cohen et al. ............ 379/93.15 |
| 4,935,954 A | 6/1990 | Thompson et al. ...... 379/93.14 |
| 5,138,653 A | 8/1992 | Le Clerq ................. 379/93.24 |
| 5,146,488 A | 9/1992 | Okada et al. ........... 379/100.13 |
| 5,193,110 A | 3/1993 | Jones et al. .............. 379/93.14 |
| 5,317,628 A | 5/1994 | Misholi et al. .......... 379/93.14 |
| 5,333,266 A * | 7/1994 | Boaz et al. ............... 379/93.15 |
| 5,349,636 A | 9/1994 | Irribarren ................. 379/93.15 |
| 5,479,411 A | 12/1995 | Klein ....................... 370/110.1 |
| 5,487,100 A | 1/1996 | Kane ........................ 379/93.24 |
| 5,524,137 A * | 6/1996 | Rhee ..................... 379/100.13 |
| 5,530,740 A | 6/1996 | Irribarren et al. ........ 379/93.24 |
| 5,559,611 A | 9/1996 | Bloomfield et al. ........ 358/407 |
| 5,608,786 A | 3/1997 | Gordon ....................... 358/402 |
| 5,633,916 A | 5/1997 | Goldhagen et al. ...... 379/93.24 |
| 5,646,981 A | 7/1997 | Klein ....................... 379/93.24 |
| 5,647,002 A | 7/1997 | Brunson ................... 379/93.24 |
| 5,675,507 A | 10/1997 | Bobo, II ................ 379/100.01 |
| 5,737,395 A * | 4/1998 | Irribarren et al. ........ 379/93.24 |
| 5,740,231 A * | 4/1998 | Cohn et al. .............. 379/93.01 |
| 5,825,854 A * | 10/1998 | Larson et al. ............ 379/93.24 |
| 5,872,926 A * | 2/1999 | Levac et al. ............. 379/93.15 |
| 5,937,161 A * | 8/1999 | Mulligan et al. ........ 379/93.24 |

\* cited by examiner

*Primary Examiner*—Stella Woo
(74) *Attorney, Agent, or Firm*—Standley & Gilcrest LLP

(57) ABSTRACT

A system is disclosed for integrating electronic mail, voice mail, and fax mail in a universal mailbox. Message receivers may access their messages with a telephone or a computer regardless of the communication medium used by the message sender. Using a telephone, message receivers may playback voice mail, redirect fax mail, and "listen" to e-mail through a text-to-speech conversion process. Using a computer and modem, message receivers may playback voice mail, view fax mail, and read e-mail by accessing the universal mailbox via connection software. Message senders and receivers may choose from a variety of filter and forward options that allow them to manage their communications via the universal mailbox. Forwarding and conversion of messages is performed automatically. The options are used to define a set of rules to be applied to inbound and outbound messages so that messages are sent and received in accordance with the preferences of the senders and receivers.

89 Claims, 17 Drawing Sheets

CALL FLOW
E-MAIL MENU #1

(IF MESSAGE IN MAILBOX...) YOU HAVE X NEW (AND Y SAVED) E-MAIL MESSAGES. TO LISTEN TO YOUR MESSAGES, PRESS 1. TO CHANGE YOUR MAILBOX OPTIONS, PRESS 3.

(ELSE IF NO MESSAGES IN MAILBOX...) YOU HAVE NO NEW E-MAIL MESSAGES. TO CHANGE YOUR MAILBOX OPTIONS, PRESS 3.

1 → [FIRST/NEXT][NEW/SAVED] MESSAGE.
(PLAY THE MESSAGE.)
TO PLAY THIS MESSAGE AGAIN, PRESS 1. TO SAVE IT, PRESS 2. TO DELETE IT, PRESS 3. TO REPLY TO IT, PRESS 4. TO FAX IT, PRESS 5. TO PLACE A CALL, PRESS #

- 1 → (PLAY THE MESSAGE)
- 2 → (SAVE THE MESSAGE) MESSAGE SAVED.
- 3 → (DELETE THE MESSAGE) MESSAGE ERASED.
- 4 → (REPLY MENU)
- 5 → PLEASE DIAL THE AREA CODE AND NUMBER OF THE FAX MACHINE NOW. (GET FAX NUMBER) YOUR E-MAIL WILL BE FAXED TO YOU IMMEDIATELY.

2 → TO TURN YOUR E-MAILBOX [ON/OFF] PRESS 1.
TO TURN E-MAIL NOTIFICATION [ON/OFF] PRESS 2.

- 1 → (TURN E-MAILBOX [ON/OFF])
- 2 → (TURN E-MAIL NOTIFICATION [ON/OFF])

FIGURE 17

SYSTEM FOR INTEGRATED ELECTRONIC COMMUNICATIONS

This application is a continuation of U.S. patent application Ser. No. 08/665,564 filed Jun. 18, 1996 Abandoned, entitled SYSTEM FOR INTEGRATED ELECTRONIC COMMUNICATIONS.

BACKGROUND OF THE INVENTION

1. Field of the Invention

The present invention relates generally to communication technologies such as electronic mail (e-mail), voice mail, and facsimile (fax) mail messaging. Particularly, the present invention relates to systems for seamlessly integrating communications to facilitate access to electronic mail, voice mail, and fax mail messages via multiple single access points.

2. Description of the Related Art

Communications technology today allows individuals to send messages to one another from virtually any location in the world at virtually any time of day. The variety of communication modes (e.g., telephone, computer) and communication media (e.g., e-mail, voice mail, fax mail) available today allows individuals to choose one appropriate for the circumstances. For example, a sales representative in London who needs to contact a home office in Boston may choose to call the home office at 8:00 AM local time knowing that no one will be in the office to answer the call, but that voice mail is available so a message may be left for the appropriate party. Alternatively, the sales representative may choose to send e-mail to the appropriate party.

In general, message senders today may select from a variety of communication media while message receivers are limited to the option selected by the message sender. If the sender uses the telephone to leave a voice mail message, the message receiver is required use a telephone to retrieve the voice mail message. If the sender uses a computer to send an e-mail message, the message receiver is required to use a computer to retrieve the e-mail message. In the voice mail example, it may be the case that, on the particular day the voice mail message was left, the intended receiver has access to a computer terminal and modem, but does not have access to a telephone to retrieve the voice mail message. In the e-mail example, on the day that the e-mail was sent, the intended receiver may have access to a telephone, but may not have access to a computer terminal and modem to read the e-mail message. In both instances, the message receiver may be unable to retrieve the message because the available communication mode may not be used to retrieve the message. Furthermore, even if the message receiver has access to a telephone, a computer, or some other communication device, the receiver may prefer using one device over the others. For example, the receiver may spend most of his working day on a computer and may therefore, prefer to retrieve all of his inbound messages—regardless of the originating communication medium—using his computer.

The inability to alter the message medium after a message has been sent (or to use a communication mode other than the one selected by the sender) unnecessarily burdens both message senders and message receivers. Senders and receivers may be required to select a medium prior to communicating so the parties are assured the communication will be received in a timely manner. If circumstances for the receiver change at any point following selection of the medium and the receiver is unable to notify the sender of the change, the receiver may risk missing the sender's communication because the message may not be accessible using an alternate communication mode. In addition, the inability of a message receiver to retrieve all inbound messages using a single communication mode or device results in additional burdens. Receivers are inconvenienced when they are required to switch, for example, between the telephone to retrieve voice mail messages and the computer to retrieve e-mail messages.

Technologies have been introduced that address the inconveniences imposed by widespread use of different messaging media. For example, Text-To-Speech (TTS) technology allows written messages to be heard by a message receiver. However, message receivers are generally required to integrate this technology into their own customized telecommunications/computer environments. Messages in differing media (e.g., e-mail, voice mail, fax mail) have not been seamlessly integrated into a single, universal mailbox with capabilities for same-media and cross-media notification and responses.

SUMMARY OF THE INVENTION

The present invention addresses the limitations in current communications technology that require receivers to retrieve messages in accordance with a predetermined communication medium or in accordance with the communication mode selected by senders. The present invention is a seamlessly integrated communications system that combines e-mail, voice mail, and fax mail messages in a universal mailbox with capabilities for same-media and cross-media notification and responses. The universal mailbox supports cross-media messaging so all inbound messages—regardless of the originating communication medium—may be retrieved by a message receiver using a single access device or communication mode such as a telephone or computer. Cross-media notification capabilities allow a message receiver, for example, to be paged when a new e-mail message arrives or to get an e-mail message when a voice mail message arrives. Cross-media responding allows a message receiver, for example, to send a voice mail message in response to an e-mail message, send an e-mail message in response to a voice mail message, send a fax in response to an e-mail message, etc.

The universal mailbox serves as a single access point for communication media such as e-mail, voice mail, and fax mail and allows message receivers to access their messages using a single communication mode or device. In a first communication mode using a standard telephone, receivers may listen to voice mail messages, redirect fax mail to a fax machine, or "listen" to e-mail messages. E-mail messages are automatically reformatted or converted to a voice mail format through a text-to-speech conversion process. In a second communication mode using a computer and modem, users may playback voice mail messages, view fax mail messages, or read e-mail messages. Messages are automatically reformatted or converted into the appropriate format (e.g., xing protocol.)

The present invention also provides an alternative platform from which to deliver newsworthy and up-to-date information. Using a standard telephone (telephone access), users may listen to the latest stock quote prices, news stories about competitors and customers, and sports score updates from favorite sports teams—information generally available only via on-line databases. Message reformatting or conversion is done automatically by a telecommunications or remote access (on-line) information service provider (collectively, access services) that deliver inbound messages so message receivers need only specify a preferred communication medium to take advantage of the features and functionality of the present invention.

The present invention offers a variety of features to both "senders" and "receivers" of messages. Senders are users who address communications to the universal mailbox. Senders use a particular communication mode (e.g., telephone, computer/modem) to send messages. Initially, messages are routed to and stored in a mailbox (i.e., message repository) compatible with the sender's communication mode/medium. For example, messages sent via the telephone may be stored in a voice mailbox. Messages sent via a computer and modem may be stored in an electronic mailbox.

Receivers are owners of the universal mailbox and are the users to which the individual voice mail, fax mail, and e-mail messages are addressed. For a receiver, the universal mailbox serves as a single message repository from which the receiver may retrieve voice mail, fax mail, and e-mail messages. To take advantage of the universal mailbox, the message receiver indicates a preferred communication medium by selecting options that define rules to be applied automatically by the service provider or access service to inbound messages. For example, a receiver may, by selecting certain options, define a rule to request that messages initiated via the telephone be stored in a voice mailbox and forwarded to an e-mail mailbox for later viewing. Alternatively, a receiver may, by selecting certain options, define a rule to request that messages initiated via a computer/modem (i.e., e-mail messages) be stored in an e-mail mailbox and forwarded to a voice mailbox for later retrieval. Any reformatting or conversion of the message that is required is performed automatically as part of the forwarding operation. Receivers and senders may also select options for defining rules to send and receive notifications of incoming messages. Although messages may be stored in and/or forwarded to different-physical locations, from the message receiver's viewpoint, there is one universal mailbox (or message repository) that he or she may access to retrieve inbound messages.

To use the universal mailbox of the present invention, the receiver selects filter and forward options to define rules applicable to inbound messages. As messages addressed to the receiver arrive at the access service (which facilitates delivery of the message), the receiver's rules are applied so all forwarding and conversion of messages (if necessary) may be performed automatically. In addition, notification rules, if defined, are applied so the receiver may be alerted to the incoming messages. The receiver then uses the appropriate communication mode (e.g., telephone, computer) to retrieve the inbound messages. For example, a receiver may dial into a voice mailbox with a standard telephone and listen to voice mail messages, redirect fax mail to a local fax machine, or "listen" to e-mail messages (telephone access.) Alternatively, a user may dial into an e-mail mailbox with a computer and playback voice mail messages, view fax mail messages, and read e-mail messages (computer access.)

BRIEF DESCRIPTION OF THE DRAWINGS

FIG. 17 is a flowchart for the telephone access service call flow for a preferred embodiment of the present invention.

DETAILED DESCRIPTION OF PREFERRED EMBODIMENT(S)

Figure 1:
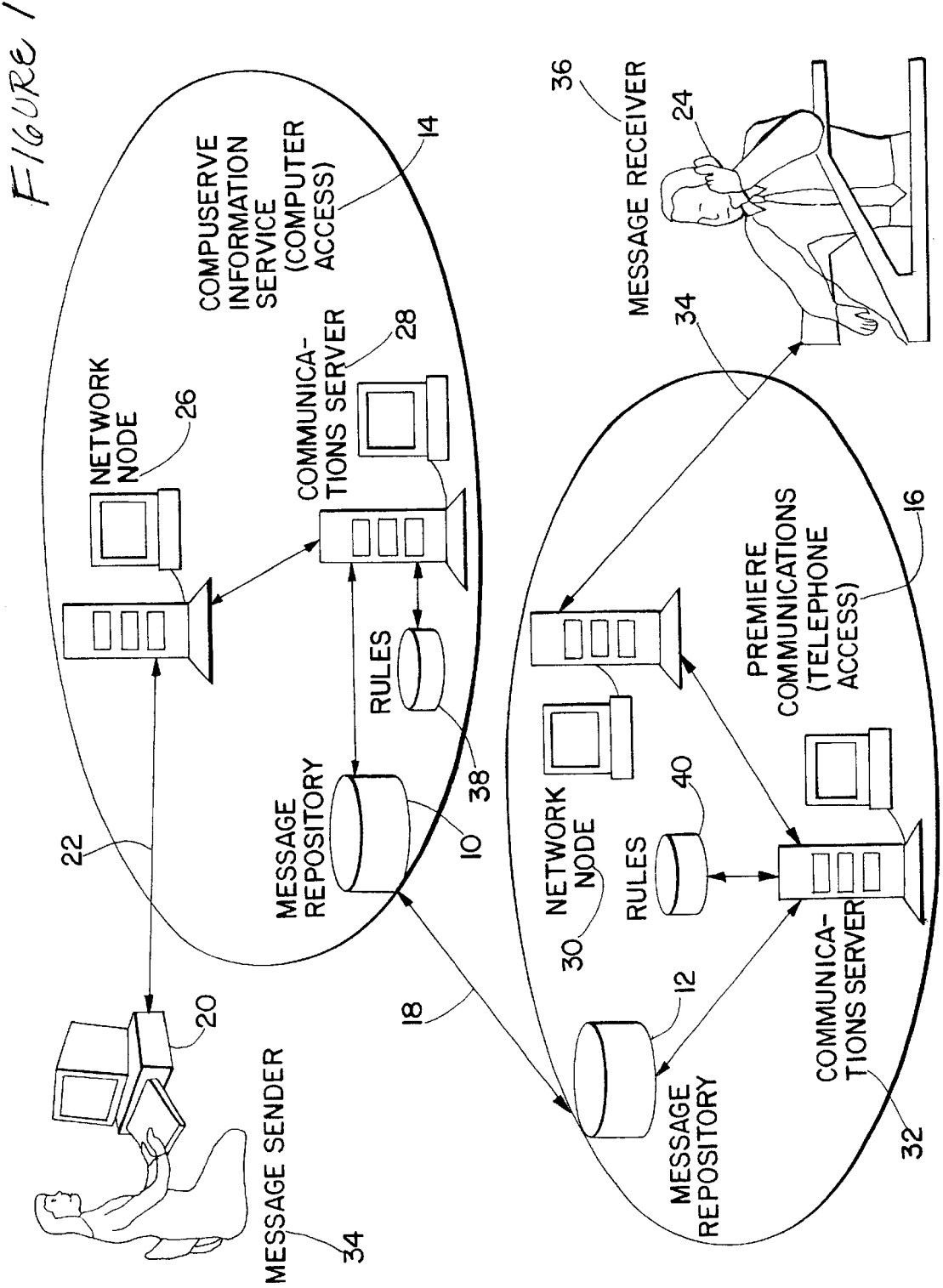
FIG. 1 is a system organization diagram of the primary components for a preferred embodiment of the present invention.

The present invention is a sophisticated computer system that facilitates communications between senders and receivers of e-mail, voice mail, and fax mail messages. The system is comprised of a collection of application programs and services hosted on different computers (or servers) and various devices that are interconnected by an infrastructure that supports communications between the participating entities. In a preferred embodiment of the present invention, the application programs and services as well as the supporting hardware components of the present invention may be developed and maintained by different service providers who cooperate with one another to provide the features and functionality of the present invention. Using this arrangement, each service provider may focus on the development of technology suited to its particular area of expertise. In an alternative embodiment of the present invention, the features and functionality may be developed and maintained by a single service provider or access service. The service provider or access service on which the message receiver relies for delivery of voice mail, e-mail, and fax mail messages knows the receiver's preferences as defined in a set of rules so all messages may be delivered to the receiver in accordance with his or her preferences. The ability to receive cross-media messages and notifications based on rules defined in accordance with user preferences is unique to the present invention.

The features and functionality of the present invention may be described in accordance with the following terms:

| | |
|---|---|
| Message: | a communication in writing, speech, or signals; substantive information to be conveyed from one party to another |
| Senders: | users sending messages to a user of the universal mailbox |
| Receivers: | users of the universal mailbox who receive messages from senders |
| CompuServe Mailbox: | on-line mailbox into which receivers dial with a computer and a modem to retrieve their voice, fax, and e-mail messages |
| Premiere Mailbox: | mailbox into which receivers dial a standard telephone to retrieve their voice, fax and e-mail messages |
| Voice mail: | a recorded voice message sent to the universal mailbox |
| Fax mail: | a digitized fax message sent to the universal mailbox |
| E-mail: | a text message sent to the universal mailbox |
| Sender Options: | options to send voice, fax, text or translated voice-to-text messages |
| Receiver Options: | options available to immediately notify a receiver of a new message or to deliver a message to an alternate device/address |
| Filter and Forward: | process of applying rules based on the sender of a message to immediately notify a receiver of a new message or to deliver a message to an alternate device/address |
| Store and/or Forward: | process of storing messages for later review |
| Universal Mailbox: | integrated message repository for accessing messages using different communication modes; may be comprised of message repositories maintained by different service providers |
| Message Data: | addressing/routing information and substantive information to be conveyed to a receiver |
| Message Format: | method of organizing/arranging/encoding message data to facilitate transport, storage, retrieval, display, etc. |
| Communication/Message Medium: | method for conveying a message such as voice mail, e-mail, fax mail |
| Communication Mode: | means or method for sending or receiving messages such as a telephone, computer, pager, etc. |
| Service Provider: | provider of access to a universal mailbox in accordance with a particular communication mode (e.g., telephone access, computer access). A single service provider may support more than one communication mode or several service providers may support a single communication mode. |

Referring to FIG. 1, a system organization diagram for a preferred embodiment of the present invention is shown. The universal mailbox of the present invention may actually be comprised of more than one message repository 10, 12. Inbound messages in accordance with a first communication medium that are to be retrieved using a second communication medium may be stored initially in one message repository and then copied to another message repository for conversion and forwarding to the intended receiver. Refor-matting and/or conversion may be performed as part of the message forwarding operation. Alternatively, reformatting/conversion operations may be performed when a receiver retrieves messages. Communications with each message repository may be facilitated by message servers that process inbound and outbound messages. For example, the message servers may apply a message receiver's rules (as defined in accordance with filter and forward options) to the receiver's inbound messages. Sender rules may be applied by the message servers to outbound messages. Collectively, the servers and associated message repositories function as message gateways so that users may access messages in different communication media using different communication modes.

Each mailbox shown in FIG. 1 (10, 12) may serve as a repository for a receiver's messages and may store messages in accordance with pre-defined protocols and formats for accessing, reviewing, and managing the messages. The message repository may be implemented as a database from which messages may be retrieved. Access to and communications with a message repository that is part of the universal mailbox may be facilitated by a computer access service provider such as the CompuServe Information Service 14. Access to and communications with a universal mailbox message repository may also be facilitated by a telephone access service provider such as Premiere Communications 16. In the event the message repositories 10, 12 are maintained by different service providers 14, 16, a dedicated communication link 18 may be established between the repositories 10, 12 so messages may be transferred between the repositories, reformatted or converted if necessary, and hence, delivered to message receivers in a timely manner and in accordance with the receiver's preferences. In a preferred embodiment of the present invention, the dedicated communication link is a X.25 link between network nodes belonging to the respective service providers. Message repositories may hold both inbound and outbound messages.

Different service providers 14, 16 may facilitate access to message repositories of the universal mailbox in accordance with different communication modes. For example, one service provider 14, such as the CompuServe Information Service, may provide access to a message repository via a computer and modem 20 (computer access.) The computer may be equipped with connection software that has a graphical user interface, such as the CompuServe Information Manager for Windows (WinCIM). The connection software allows the user to establish and maintain a connection 22 with the on-line information service 14 and to perform tasks and interact with the service. Preferably, the connection software is equipped with an audio file player so that the user may listen to voice mail messages in an audio file format such as the "xing" file format. The connection software is also, preferably, equipped with a fax viewer so the user may view fax mail messages. Another service provider 16, such as Premiere Communications, may provide access to a message repository via a telephone 24 (telephone access.) Users of the service may send and retrieve messages by pressing buttons in response to menu options and talking to recording devices or live operators. With the present invention, message senders and receivers may choose the user interface (e.g., graphical user interface, automated telecommunications interface) with which they are most familiar and comfortable to both send and retrieve messages regardless of the communication medium selected by the original message sender or receiver.

Each service provider or access service may install and maintain servers 26, 28, 30, 32, network nodes, and other devices (e.g., switches) configured in accordance with known methods for establishing wide area or local area networks that support the services offered by the provider. Users choose a communication mode (such as a computer 20 or a telephone 24) to establish connections 22, 34 with the service provider's network. Interactions with message repositories 10, 12 may then be facilitated by Communications Servers 28, 32 that are in turn accessible via Network Nodes 26, 30 that manage network traffic between message senders and receivers 34, 36 and message repositories 10, 12.

Communications between a message sender and a message receiver may be accomplished in accordance with the present invention as follows. A message sender 20 (who happens to be an information service subscriber, but does not have to be) who wishes to send an e-mail message to a message receiver 24 may establish a connection 22, via a Network Node 26, with an information service 14 such as the CompuServe Information Service. Alternatively, messages may be sent through other third party sources or services such as the Internet, etc. to the information service 14. The message sender 34 composes the message on the computer 20, supplies an identifier for the message receiver (such as a member number), and sends the message. The e-mail message may be routed by the Network Node 26 to a Communications Server 28 of the information service which, based on known preferences of the message receiver 36 as defined in a set of rules, makes arrangements to forward the e-mail message to another service provider 16 (e.g., Premiere Communications) that facilitates access to e-mail messages via the telephone 24. The e-mail message may then be stored in a message repository 12 of the telephone access service provider 16 for later access by the message receiver 36. When the message receiver 36 calls in to retrieve his messages, the original e-mail message may be translated by the Communications Server 32 using a text-to-speech translation process. Although the message sender 34 chose to communicate with the message receiver 36 via e-mail, using the present invention, the message receiver 34 is able to access the message using a different communication mode (i.e., the telephone 24.) The conversion of the message from one communication medium to another is performed automatically. The present invention allows the message receiver to select options to define a rule that then allows him or her to "listen" to e-mail messages which have been forwarded from the information service message repository 10 to the telephone service message repository 12.

The message receiver 36 may also be a message sender and the message sender 34 may be a message receiver. To send a voice mail message to a message receiver, the message sender 36 may access the telecommunications network 34 of the telephone access service 16 (e.g., Premiere Communications) to leave a voice mail message for a message receiver. The voice mail message may be routed by the Network Node 30 to a Communications Server 32 of the telephone access service 16 which, based on known preferences of the message receiver 34, makes arrangements to forward the voice mail message (e.g., via e-mail messaging capabilities such that the voice mail message as stored in an audio file is attached to an e-mail message) to another service provider 14 (e.g., CompuServe Information Service.) The e-mail message and associated voice mail message in the audio file may then be stored in a message repository of the computer access service provider 14 for later access by the message receiver 34. When the message receiver logs in or connects to the information service (using a computer 20) to retrieve her e-mail messages, the message receiver may retrieve the original voice mail message by accessing the associated e-mail message. The computer's 20 connection software equipped with the audio player may then play for the message receiver 34 the original voice mail message as stored in the audio file format. Fax mail messages may also be forwarded in a similar manner from the telephone access service 16 to the computer access service 14 so message receivers may view fax mail messages using the fax viewer capabilities of the connection software.

Figure 2:
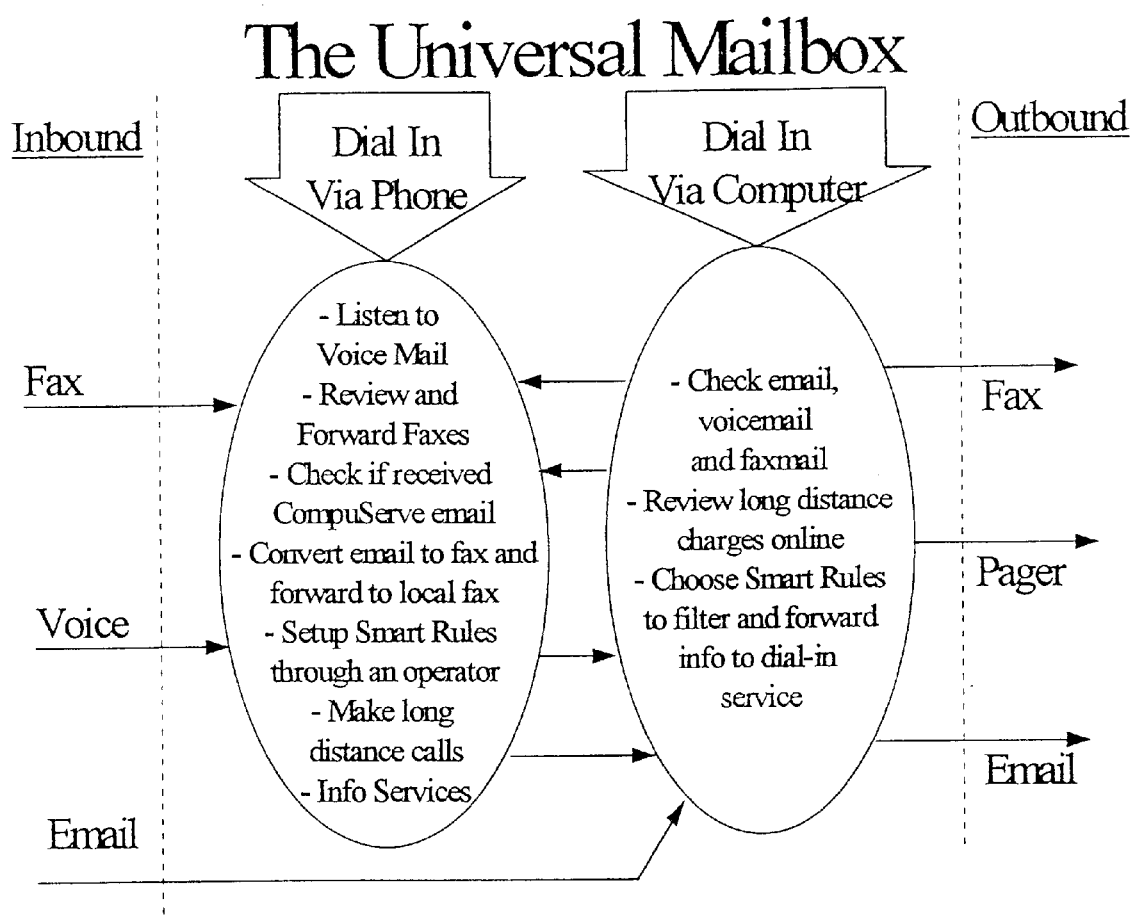
FIG. 2 is a diagrammatic representation of the functionality of the present invention.

Referring to FIG. 2, an overview of the functionality provided by the present invention in a preferred embodiment in which two access service providers cooperate to provide services and functionality in accordance with the present invention is shown. As shown in FIG. 2, using the telephone to dial into the universal mailbox, a user may listen to voice mail, review and forward faxes, determine if e-mail has been received, convert an e-mail message to a fax mail message and forward it to a local fax machine, talk to an operator to set up rules for processing inbound messages (e.g., arrange for notification of inbound messages), and make long distance calls. Using the computer to access the universal mailbox, a user may check e-mail, voice mail, and fax mail messages, review long distance charges on-line, and select options to set up rules for filtering and forwarding of information to the dial-in or telephone access service.

Figure 3:
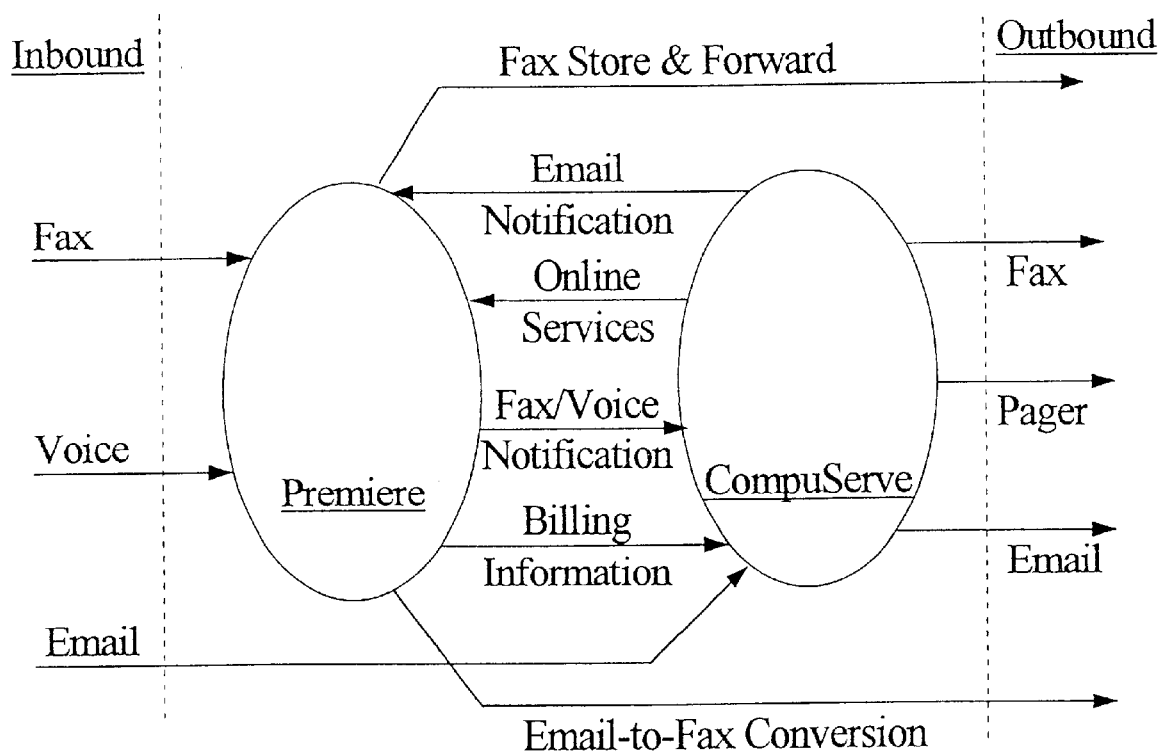
FIG. 3 is a data flow diagram for a preferred embodiment of the present invention.

Referring to FIG. 3, the flow of data between two access service providers in accordance with a preferred embodiment of the present invention is shown. As shown in FIG. 3, inbound fax mail and voice mail messages are first processed by a telephone access service (e.g., Premiere.) Depending on the options selected by the sender and receiver, messages and/or notifications may be forwarded to the computer access service (e.g., CompuServe.) Inbound e-mail messages are first processed by a computer access service (e.g., CompuServe.) Depending on the options selected by the sender and receiver, messages and/or notifications may be forwarded to the telephone access service (e.g., Premiere.) Also, depending on the options selected by the receiver, rules may be applied to messages so they are converted automatically from one communication medium to another.

Figure 4:
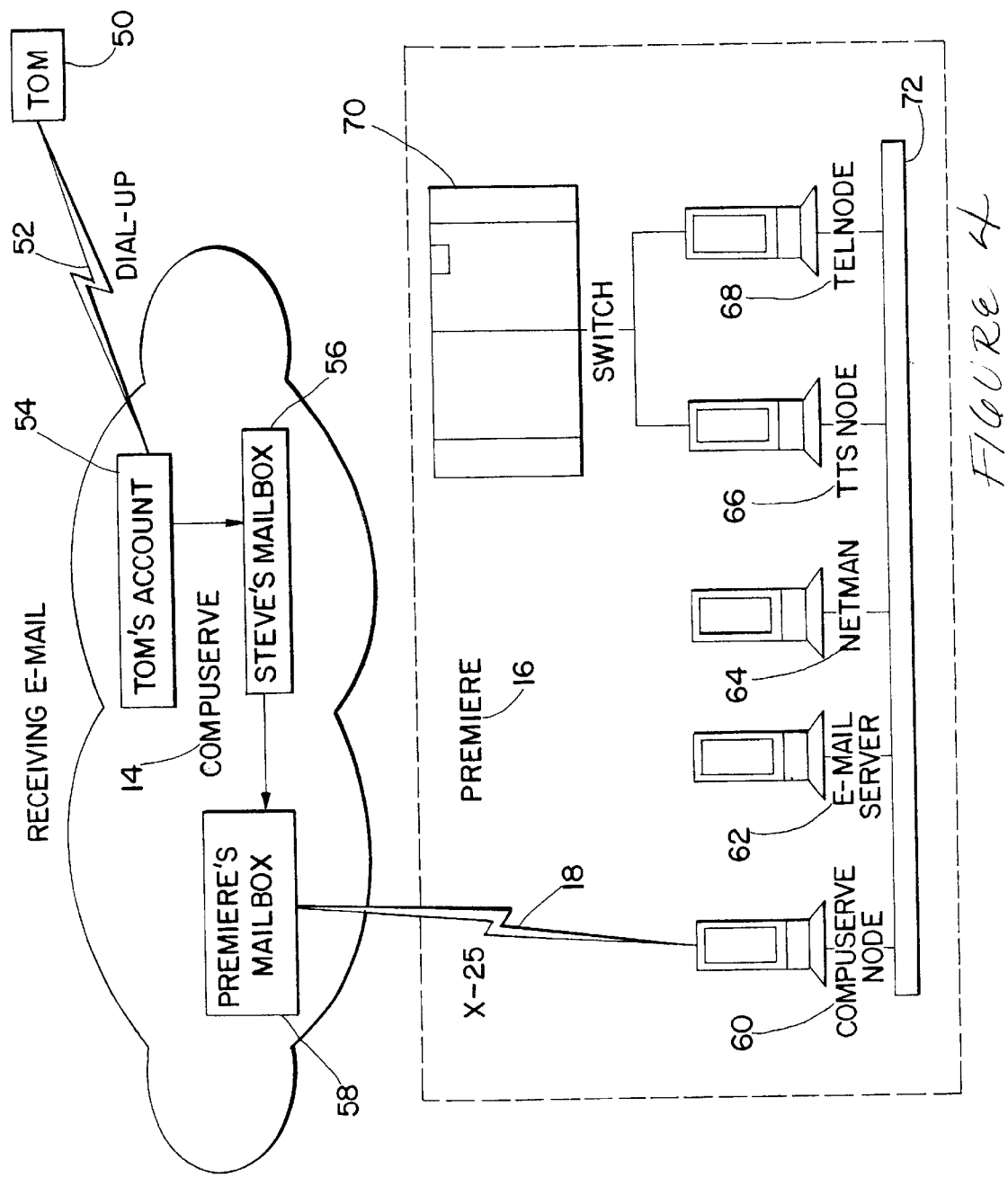
FIG. 4 is a block diagram of the primary components for a telephone access service's internal network for a preferred embodiment of the present invention.

Referring to FIG. 4, a block diagram of the primary components for a telephone access service's (e.g., Premiere) internal network for a preferred embodiment of the present invention is shown. The telephone access service's system, preferably, supports receiving, playing, saving, deleting, faxing, and replying to e-mail messages. As shown in FIG. 4, the functionality may be provided by several nodes. The nodes and servers that comprise the telephone access service's internal network may be part of a local area network as supported by a commercially available networking package such as Novell's Netware 72. Preferably, one node (e.g., CompuServe Node) 60 serves as an e-mail gateway to the computer access service's network. This e-mail gateway node 60 handles the downloading of sign-up requests and new e-mail messages as well as the sending of e-mail message replies. It receives a forwarded copy from the computer access service of each e-mail message for participating subscribers. Also, it maintains the X.25 dedicated link to the computer access service's network. Preferably, the e-mail gateway node handles only e-mail and is not responsible for call handling. The e-mail gateway node repeatedly checks the mailbox account (e.g., Premiere's Mailbox) 58 at the computer access service (e.g., CompuServe) 14 for new e-mail messages and handles sending e-mail replies to the mailbox account 58. Preferably, another server (e.g., E-mail)

62 is dedicated to the storage and retrieval of e-mail messages. When the e-mail gateway node receives a new e-mail message, it notifies another network management node (e.g., Netman) 64. This network management node 64 may, in turn, modify a customer database, for example, when a sign-up request is received. In general, the e-mail gateway node handles low-level e-mail transmission details while telephone calls are processed by other dedicated nodes (e.g., TTSNode and Telnode) 66, 68 and a switch 70.

In a preferred embodiment of the present invention, one node (e.g., TSSNode) 66 is dedicated to providing e-mail functionality during telephone calls. This e-mail functionality node 66 plays, saves, deletes, notifies, faxes, and creates e-mail replies. Generally, calls may be processed by a call processing node (e.g., Telnode) 68. However, when special buttons are pressed (e.g., *1), the call may be transferred to the e-mail functionality node 66. When the caller finishes with e-mail related features, the call may be transferred back to the call processing node 68 when the caller presses a button (e.g., *).

In accordance with the preferred embodiment of the present invention, inbound e-mail messages may be processed as follows. Referring to FIG. 4, a message sender 50 who happens to be a computer access service subscriber 54 (but is not required to be a computer access service subscriber) connects 52 to the computer access service 14 to send an e-mail message to another on-line service subscriber 56. When the e-mail message reaches the message receiver's mailbox 56 at the computer access service, a rule is activated which indicates the e-mail is to be forwarded to the telephone access service's (e.g., Premiere) mailbox 58. The e-mail gateway node (e.g., CompuServe Node) 60, which uses the dedicated link 18 to continually poll the telephone access service's mailbox 58, downloads the new e-mail message, saves it on an e-mail server 62, and notifies the network management node (e.g., Netman) 64 that a new e-mail message has arrived for the message receiver.

Figure 5:
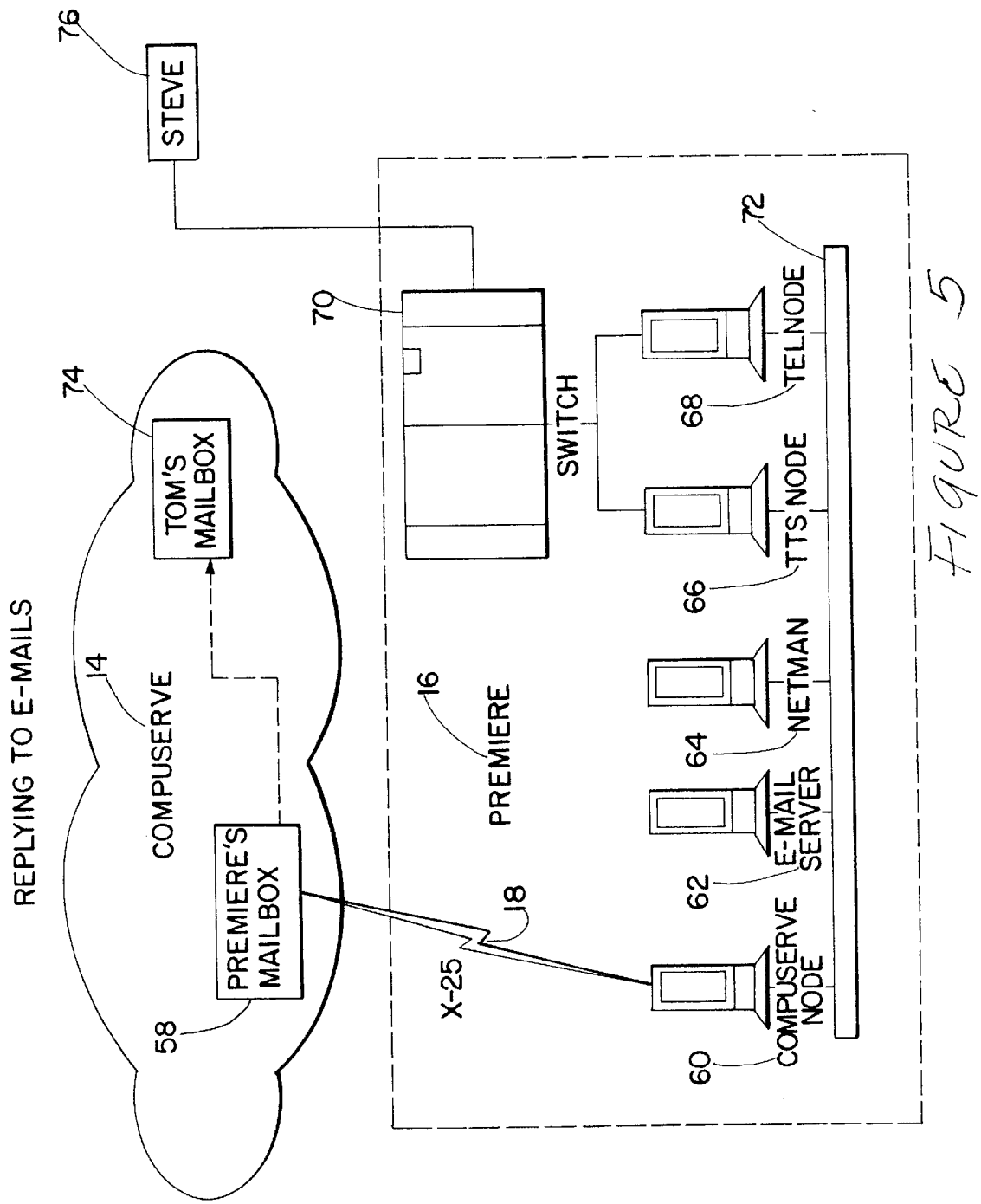
FIG. 5 is a block diagram illustrating a preferred method for replying via the telephone to electronic mail messages for a preferred embodiment of the present invention.

Referring to FIG. 5, the message receiver 76 may respond as follows. The message receiver 76 calls the telephone access service (e.g., Premiere) 16 access number. The call is processed by a switch 70 and call processing node (e.g., Telnode) 68 as follows. The caller 76 enters an authorization code and a personal identification number. The e-mail gateway node is searched to determine whether there are new e-mail messages in the caller's account. In this example, the caller has a message and is given the option of retrieving it by pressing a button sequence. The caller presses buttons (e.g., *1) to retrieve it. The call is transferred from the call processing node 68 to the e-mail functionality node 66 which answers the call. The caller presses a button (e.g., 1) to hear the new e-mail message. The e-mail functionality node 66 performs the necessary conversion and plays the e-mail message which is actually located on the e-mail server 62. After listening to the e-mail, the caller may reply by pressing a button (e.g., 4) and selecting from a list of short messages. When the caller finishes with other e-mail related tasks (e.g., listening, saving, deleting, faxing, and setting options), he presses a button (e.g., *) to make a call and is transferred from the e-mail functionality node 66 to the call processing node 68.

Both message senders and message receivers have a variety of message management options available to them. By selecting from among the available options, a set of rules to be applied to a sender or receiver's messages may be defined. Message management options are used to control the sending and receiving of messages and associated notifications so they are delivered in accordance with the preferences of both senders and receivers. Sender options are the choices a user has to send a message to the universal mailbox of a message receiver. Preferably, a sender may select a mode by which a message may be sent—for example, a standard telephone for voice or fax mail or a computer/modem for e-mail. The options available to a sender depend in part on the communication mode and related services offered by the provider.

Message receivers also have options that allow them to manage the retrieval of messages. The options allow message receivers to select the communication medium by which they would like to receive/retrieve their messages. By selecting from among the available options, a rule for cross-media messaging may be defined so that all of a message receiver's incoming messages are forwarded, converted if necessary, and stored in a single message repository from which the receiver may retrieve the messages. Cross-media responding is also possible so message receivers may respond to a message using a different communication medium that the communication medium in which the message was retrieved. For example, a message receiver may respond to voice mail using e-mail, respond to e-mail using voice mail, response to fax mail using e-mail, etc.

Inbound message options also allow a receiver (1) to be notified immediately of an inbound message and/or to redirect a message to an alternate device/address (i.e., perform an immediate action in response to the arrival of the message—immediate filter and forward options) or (2) to have messages stored in the original communication medium format or a second communication medium format for later retrieval (store and forward options.) Store and forward options provide the receiver with different ways, upon dialing in with a telephone or a computer, to retrieve and manage messages that have been stored.

Based the receiver's immediate filter and forward option settings, the receiver may be notified of an incoming message as messages (or portions of messages) may be immediately forwarded to alternate target devices/addresses such as a pager or electronic mailbox. For example, if an important voice mail message arrives at the intended receiver's voice mailbox, a notification may be sent. Notifications may include cross-media notifications in which a receiver may be notified using a communication medium that is different than the original communication medium used by the sender. For example, a page may be sent to an alphanumeric pager alerting the receiver that an e-mail message has arrived. Alternatively, an e-mail message may be sent in response to the arrival of a voice mail message. The filtering rules (in accordance with the filtering options selected by the receiver) applied to the message are based on the sender's originating telephone number or e-mail address. The forwarding options available are determined by the type of message received from the sender (e.g., voice mail, fax mail or e-mail) and the alternate target device/address (e.g., pager, e-mail account, fax machine, voice mailbox).

Figure 6:
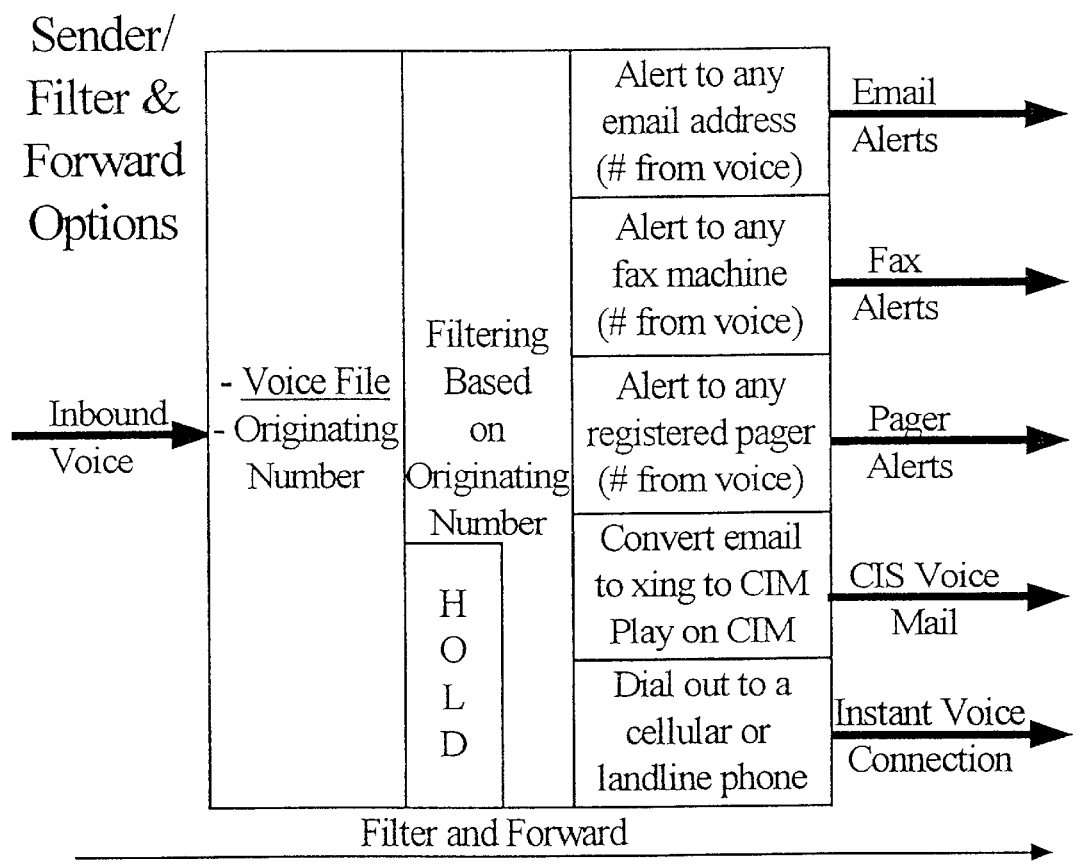
FIG. 6 is a flow diagram for the voice mail filter and forward options of the present invention.

Referring to FIG. 6, voice mail message immediate filter and forward options are shown. When a voice mail message is received, the receiver has several forwarding options based on who sent the message (as determined by the originator's telephone number):

No forwarding—hold the voice mail message in the telephone access message repository for later dial-in pickup.

Convert the voice mail message file to an audio format (such as xing) and download to the receiver's computer access message repository mailbox so the user may "listen" to the voice mail message using connection software with appropriate audio format (such as xing) support.

Send an alert (including the sender's name/number) to any e-mail address (CompuServe, Internet, etc.) that a voice mail message is waiting at the telephone access message repository. A copy of the voice mail message is left at the telephone access message repository.

Send an alert (including the sender's name/number) to a pager that a voice mail message is waiting at the telephone access message repository. A copy of the voice mail message is left at the telephone access message repository.

Send an alert (including the sender's name/number) to any fax machine that a voice mail message is waiting at the telephone access message repository. A copy of the voice mail message is left at the telephone access message repository.

Dial a cellular or landline telephone and play the voice mail to the receiver.

In addition, a receiver may choose to use several of these rules for one inbound voice message. For example, a receiver may wish to be notified via a pager and have the voice mail message forwarded to his or her computer access message repository.

Figure 7:
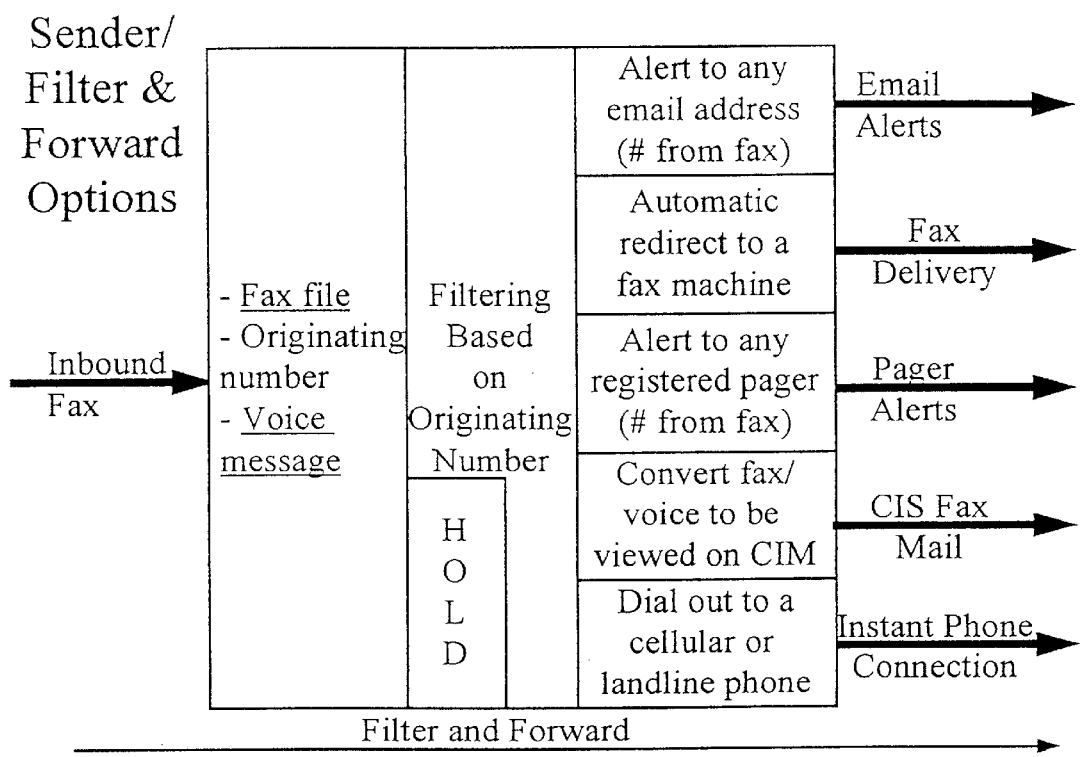
FIG. 7 is a flow diagram for the fax mail filter and forward options of the present invention.

Referring to FIG. 7, when a fax mail message is received, the receiver has several immediate filter and forward options based on who sent the message (as determined by the originator's telephone number):

No forwarding—hold the fax mail message in the telephone access message repository for later dial-in pickup.

Download the fax file to the receiver's computer access message repository. The user may "view" the fax mail message using connection software with fax viewer capabilities. A voice message sent with the fax may also be converted to an audio format protocol (such as xing) and downloaded to the computer access message repository (as a multipart message).

Send an alert (including the sender's name/number) to any e-mail address (CompuServe, Internet, etc.) that a fax mail message is waiting at the telephone access message repository. A copy of the fax mail message is left at the telephone access message repository.

Send an alert to a pager (including the sender's name/number) that a fax mail message is waiting at the telephone access message repository. A copy of the fax mail message is left at the telephone access message repository.

Redirect any inbound fax to an alternate fax machine. A copy of the fax mail message may or may not be left at the telephone access message repository.

Dial a cellular or landline telephone and play the voice message that accompanied the fax mail message.

In addition, a receiver may choose to use several of these rules for one inbound fax message. For example,-a receiver may wish to be notified via a pager and have the fax mail message forwarded to his or her computer access message repository.

Figure 8:
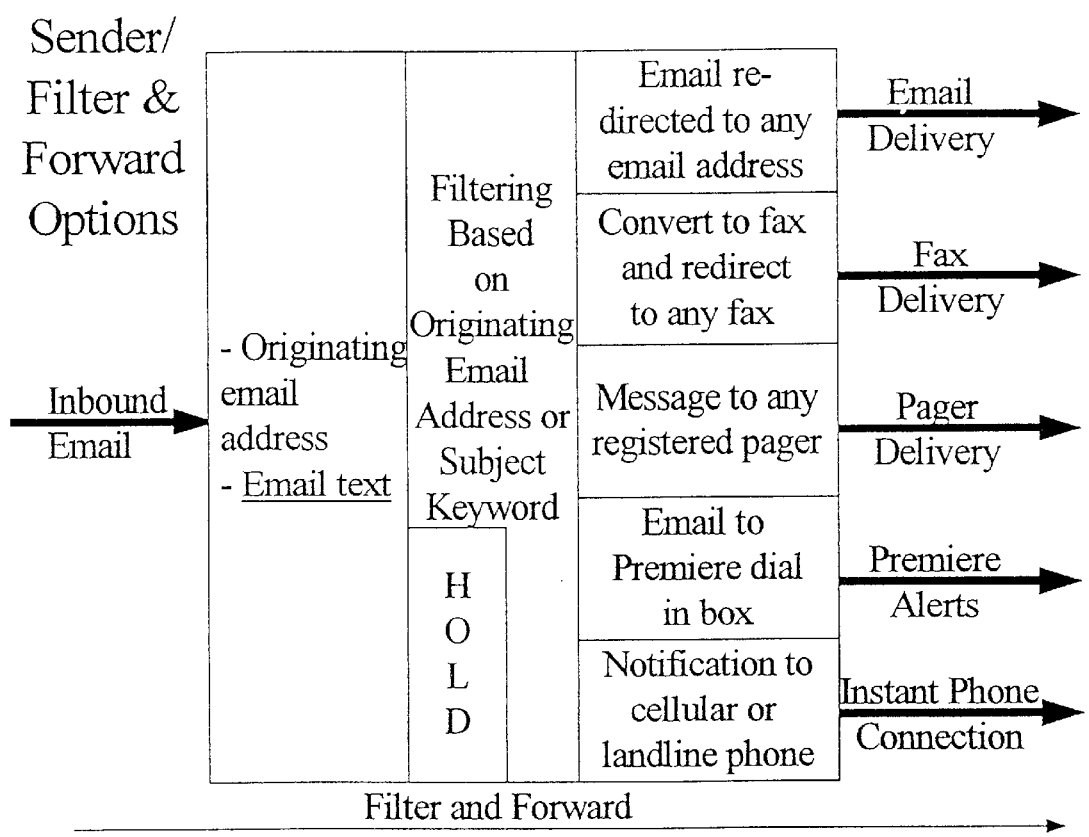
FIG. 8 is a flow diagram for the electronic mail filter and forward options of the present invention.

Referring to FIG. 8, when an e-mail message is received, the receiver has several immediate filter and forward options based on who sent the message (as determined by the originator's e-mail address.) Additional rules include keyword searches on subjects and priority/high importance messages:

No forwarding—hold the e-mail message in the computer access message repository for later on-line dial-in.

Download the e-mail message to the receiver's telephone access message repository. The user may "listen" to the e-mail message using text-to-voice translation by dialing into the telephone access service message repository. A copy may or may not be left at the receiver's computer access message repository.

Redirect the e-mail message to any e-mail address (CompuServe, Internet, etc.). A copy of the e-mail message may or may not be left in the computer access message repository.

Send an alert (including the sender's name/e-mail address and message text) to a pager that an e-mail message is waiting at the computer access message repository. A copy of the e-mail message is left in the computer access message repository.

Convert and redirect inbound e-mail message to a fax machine. A copy of the e-mail message may or may not be left in the computer access message repository.

Dial a cellular or landline telephone and play the text-to-voice converted message or a portion of that message (e.g., "You have received a message fromwith subject .")

In addition, a receiver may choose to use several of these rules for one inbound e-mail message. For example, a receiver may wish to be notified via a pager and have the e-mail message forwarded to his or her telephone access message repository.

Figure 9:
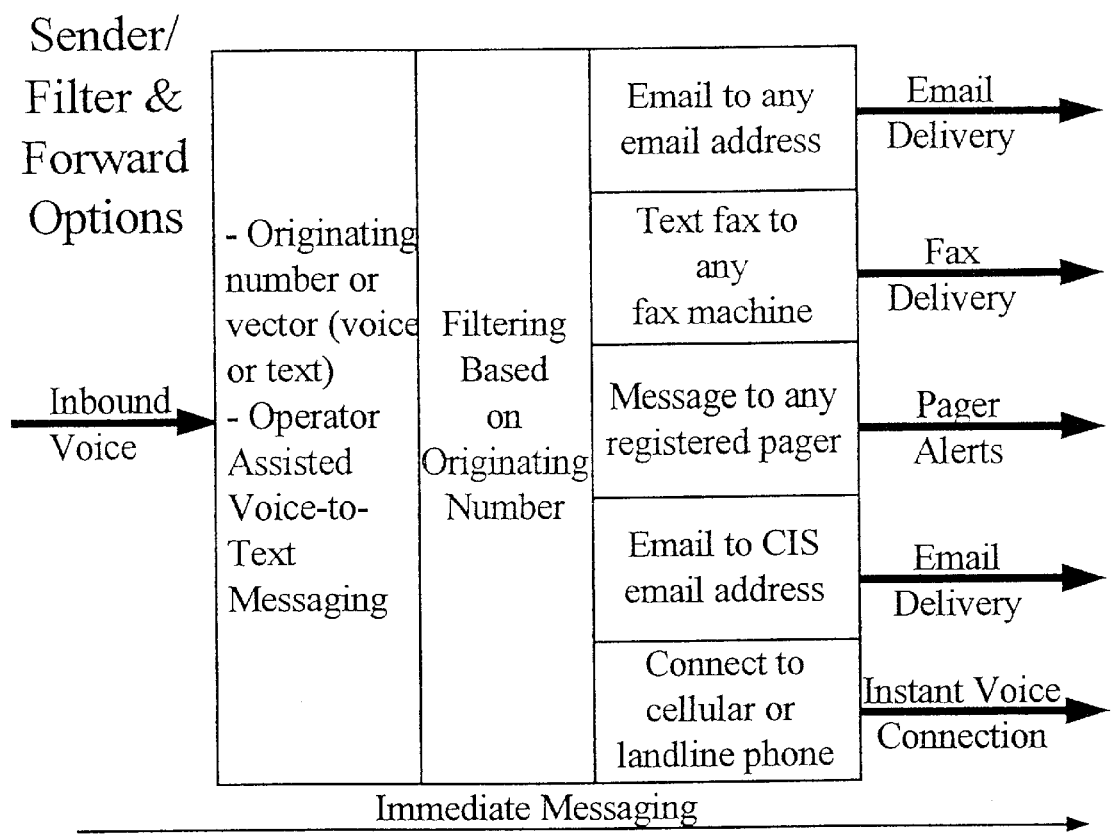
FIG. 9 is a flow diagram for the live operator assistance filter and forward options of the present invention.

Referring to FIG. 9, when an operator takes a message and transcribes it into a text message, the receiver has several immediate filter and forward options:

Send the text message (including the sender's name and message text) to any e-mail address (CompuServe, Internet, etc.)

Send the text message (including the sender's name and message text) to a pager. A copy of the e-mail message is left in the computer access message repository.

Convert and redirect the text message to a fax machine.

When a live call is on hold, the receiver has several options to be connected with the call:

A message may be sent to a pager and the receiver calls back in to join the live call.

A call may be made to a cellular telephone and/or a landline telephone. If the receiver answers, he or she is patched into call on hold.

If the receiver cannot be located, the sender may be placed into the voice mail

In addition to immediate filtering and forwarding of messages, a receiver may also store messages for later review and forward them after initial viewing. A receiver's inbound messages may be stored in either or both of two message repositories: the computer access message repository and the telephone access message repository. The options available for reviewing and forwarding messages differ based on the communication mode used to retrieve the messages and the communication medium.

For the messages stored in the telephone access message repository, receivers may review those messages by dialing in with a standard telephone. The options for reviewing the messages depend on the type of message (voice, fax, or e-mail.)

Figure 10:
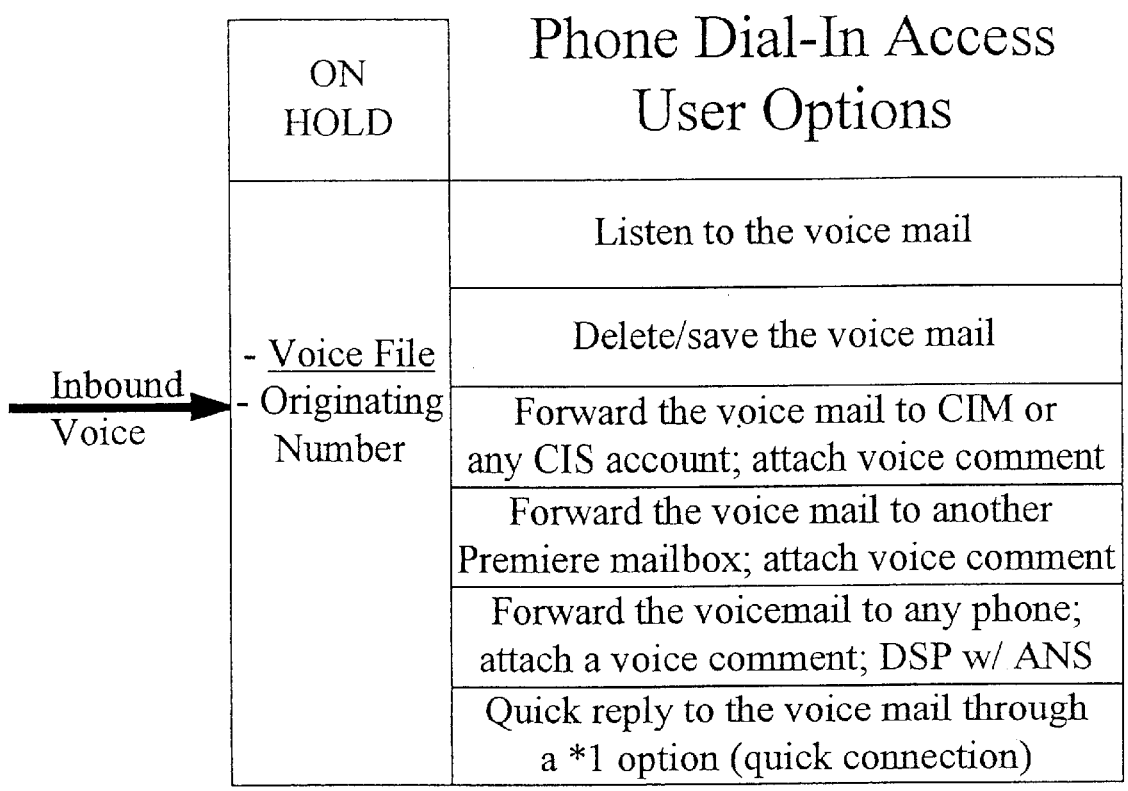
FIG. 10 is a diagrammatic representation of the voice mail telephone dial-in access user options for a preferred embodiment of the present invention.

Referring to FIG. 10, as a receiver dials into the telephone access message repository, he or she has several store and forward options to review the waiting voice mail:

Listen to the voice mail message.

Delete or save the voice mail message after review.

Forward the voice mail message to any computer access service account. The new receiver may listen to the voice mail message using connection software that supports an audio protocol such as "xing."

Forward the voice mail message to any telephone access service account. This option is similar to the forwarding options available on most corporate voice mail packages.

Forward the voice mail message to a landline or cellular telephone. Using this option, a comment may be attached to the original voice mail message and delivered to another telephone number.

Create a live call to the sender of the voice mail message by selecting a button (e.g., *). This option may automatically dial the original number and a response to the voice mail message may be delivered personally or to the sender's voice mail system.

Figure 11:
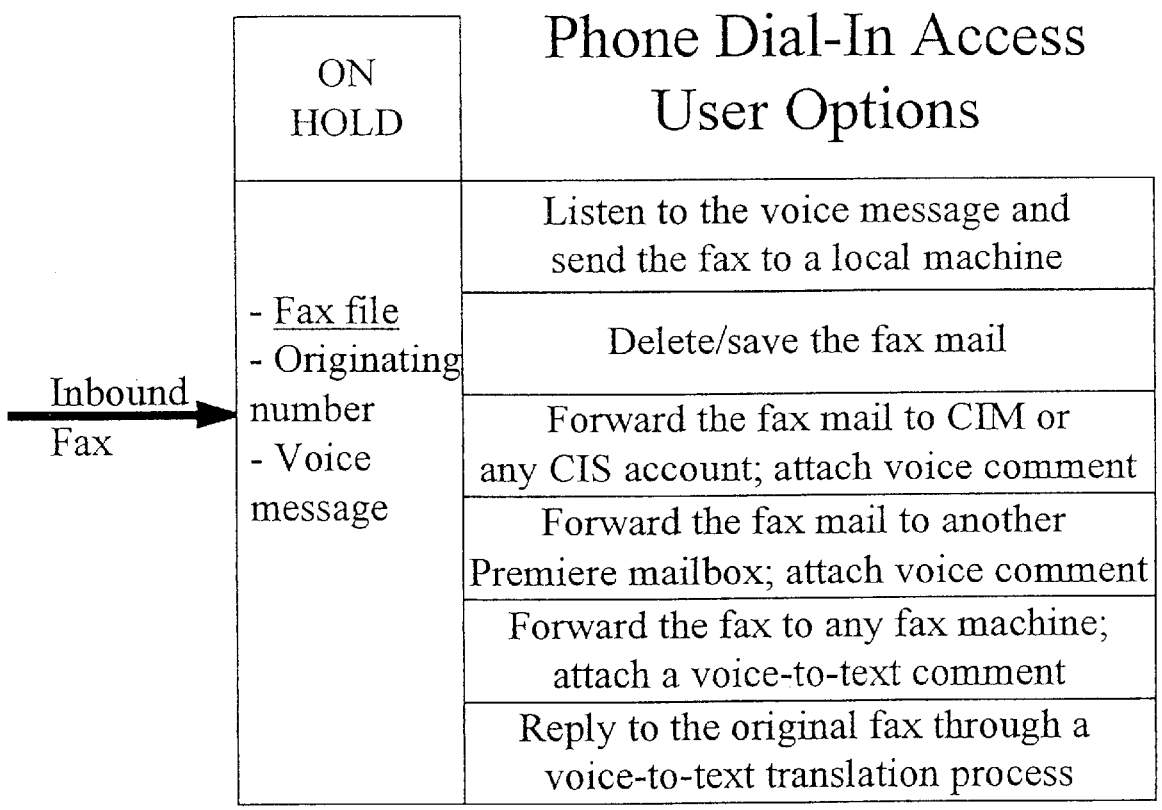
FIG. 11 is a diagrammatic representation of the fax mail telephone dial-in access user options for a preferred embodiment of the present invention.

Referring to FIG. 11, as a receiver dials into the telephone access message repository, he or she has several store and forward options to review the waiting fax mail:

Listen to the voice message with the fax mail message and send the fax to the local fax machine.

Delete or save the fax mail message after review.

Forward the fax mail message to any computer access service account. The fax mail message may be viewed using connection software with a fax viewer.

Forward the fax mail message to any telephone access service account. This option is similar to the forwarding options available on most corporate voice mail packages.

Attach a voice-to-text comment with the fax mail message and send the forwarded fax to any fax machine.

Respond to the fax immediately by selecting buttons (e.g., *1) to speak to a live operator who transcribes a voice-to-text message. The message is delivered to the originating fax machine and/or the fax machine that delivered the message.

The user may also select buttons (e.g., *2) to create a live call to the sender of the fax mail message. The sender's voice number is dialed automatically and a response to the fax mail message may be delivered personally or to the sender's voice mail system.

Figure 12:
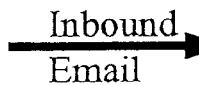
FIG. 12 is a diagrammatic representation of the electronic mail telephone dial-in access user options for a preferred embodiment of the present invention.

Referring to FIG. 12, as a receiver dials into the telephone access message repository, he or she has several store and forward options to review the waiting e-mail:

Listen to the e-mail message using a text-to-voice translation process.

Delete or save the e-mail message after review

Forward the e-mail message to any e-mail account. If needed, attach a comment to the forwarded e-mail message through a voice-to-text translation process or with a file in an audio format such as xing.

Forward the e-mail message to any telephone access service account. If needed, attach a comment to the forwarded e-mail message through a voice-to-text translation process or with a voice file. This option is similar to the forwarding options available on most corporate voice mail packages.

Attach a voice-to-text comment with the e-mail, convert to a fax format, and send the forwarded e-mail message to any fax machine.

Respond to the e-mail message immediately by selecting buttons (e.g., *1) to compose a return e-mail message with a voice-to-text translation message. In addition, a response may be created by sending a voice file (e.g., as formatted in accordance with the xing protocol) or by selecting a prerecorded message. The message is delivered to the originating e-mail address.

The user may also select buttons (e.g., *2) to create a live call to the sender of the e-mail message. The sender's voice number is dialed automatically and a response to the e-mail message may be delivered personally or to the sender's voice mail system.

For the messages that are stored in the computer access message repository, receivers may review those messages by dialing in with a modem-equipped computer. The options available to review the messages depend on the type of message (voice, fax, or e-mail.)

Figure 13:
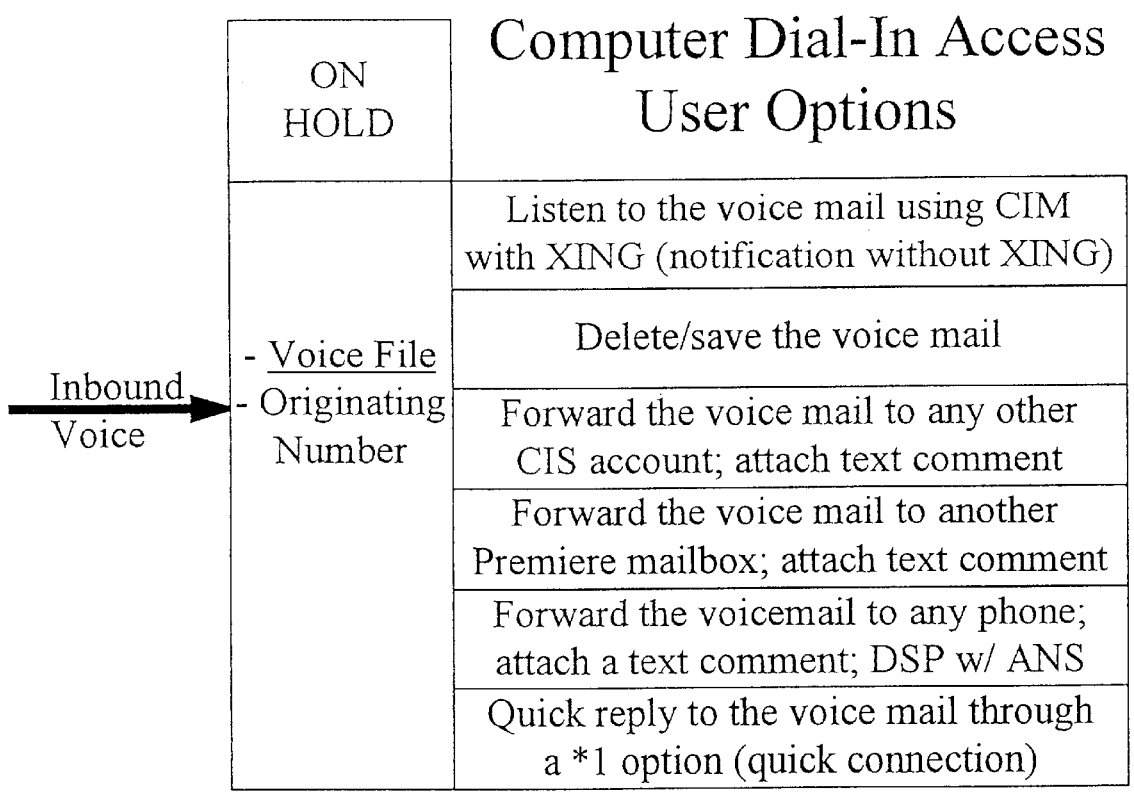
FIG. 13 is a diagrammatic representation of the voice mail computer dial-in access user options for a preferred embodiment of the present invention.

Referring to FIG. 13, as a receiver dials into the computer access message repository, he or she has several store and forward options to review the waiting voice mail message (based on the user's earlier choice to have voice mail message forwarded from the telephone access message repository to the computer access message repository):

Listen to the voice mail message using connection software with audio file support (such as xing).

Delete or save the voice mail message after review.

Forward the voice mail message to any other computer access service account with a text comment (if necessary). The voice mail message may be heard using connection software that supports an audio protocol such as xing.

Other options may be made at the computer access service interface, but performed at the telephone access message repository. For example, if a user wants to forward a voice mail message to another telephone access service account or to a cellular/landline telephone, this instruction may be delivered back to the telephone access service provider which transfers the voice mail message to the appropriate device.

Figure 14:
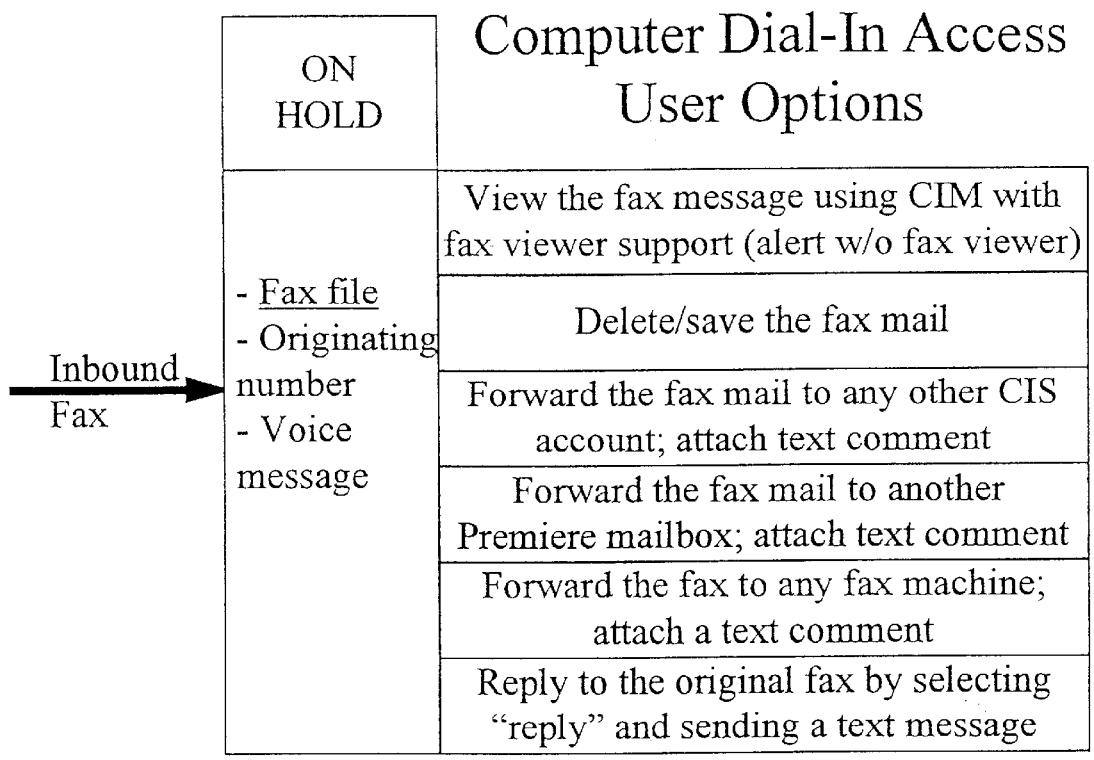
FIG. 14 is a diagrammatic representation of the fax mail computer dial-in access user options for a preferred embodiment of the present invention.

Referring to FIG. 14, as a receiver dials into the computer access message repository, he or she has several store and forward options to review the waiting fax mail message (based on the user's earlier choice to have fax mail message forwarded from the telephone access message repository to the computer access message repository):

View the fax mail message using connection software with fax viewer support.

Delete or save the fax mail message after review

Forward the fax mail message to any computer access service account with a text comment (if necessary). The fax mail message may be viewed using connection software with a fax viewer.

Attach a comment to the fax mail message and send the forwarded fax to any fax machine.

Respond to the fax immediately by selecting reply and composing a return fax. The text message may be delivered to the originating fax machine and/or the fax machine that delivered the message.

Other options may be chosen at the computer access interface, but performed at the telephone access service. For example, if a user wants to forward a fax mail message to another telephone access message repository, this instruction may be delivered back to the telephone access service which transfers the fax mail message to the appropriate address.

Figure 15:
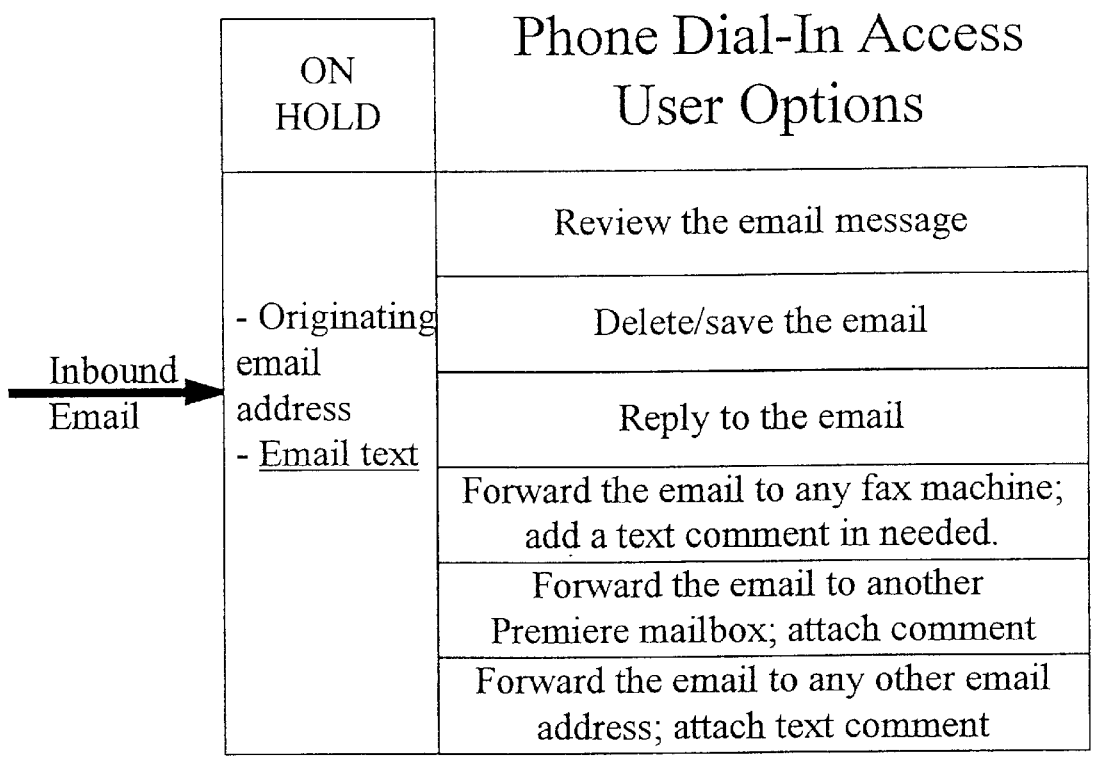
FIG. 15 is a diagrammatic representation of the electronic mail telephone dial-in access user options for a preferred embodiment of the present invention.

Referring to FIG. 15, as a receiver dials into the computer access message repository, he or she has several store and forward options to review the waiting e-mail messages:

Review the e-mail message

Delete or save the e-mail message after review

Forward the e-mail message to any e-mail account. If needed, attach a comment to the forwarded e-mail message.

Attach a comment with the e-mail, convert the text to a fax format, and send the forwarded e-mail message to any fax machine.

Respond to the e-mail immediately by selecting reply and composing a return e-mail message. The message may be delivered to the originating e-mail address.

Other options may be chosen at the computer access service interface, but performed at the telephone access service. For example, if a user wants to forward an e-mail message to another telephone access message repository, this instruction may be delivered back to the telephone access service which then transfers the e-mail message to the appropriate address.

In a preferred embodiment of the present invention, immediate filter and forward as well as store and forward options are selected using an on-line interface for the computer access service. The options are used to establish rules to be applied to inbound and outbound messages. Different rules may be established (via options) for each sender from which a message receiver expects to receive messages. Preferably, a sender is chosen from an on-line address book. By selecting a sender, the e-mail, fax mail, and voice addresses/numbers are retrieved automatically from an address database into a filtering rules area so that filtering criteria may be established for the sender. Next, the forwarding rules are defined for each inbound communication. For example, if a voice mail message is received from John Smith (the sender), the receiver defines specific voice forwarding options for John Smith. If a fax mail message is received from John Smith, the receiver defines specific fax forwarding options for John Smith. If an e-mail message is received from John Smith, the receiver may specify e-mail forwarding options for the message. The receiver may also set options to define rules for receiving notification of incoming messages.

The final step is to download the rules to the telephone access service so voice and fax filtering and forwarding preferences may be applied as communications are received at the telephone access message repository. Preferably, the telephone access rules database is updated as changes are made to the rules in the computer access service rules database so that the same filter/forward rules are applied to a message receiver's inbound messages whether they are initiated by a message sender via the telephone or the computer.

Figure 16:
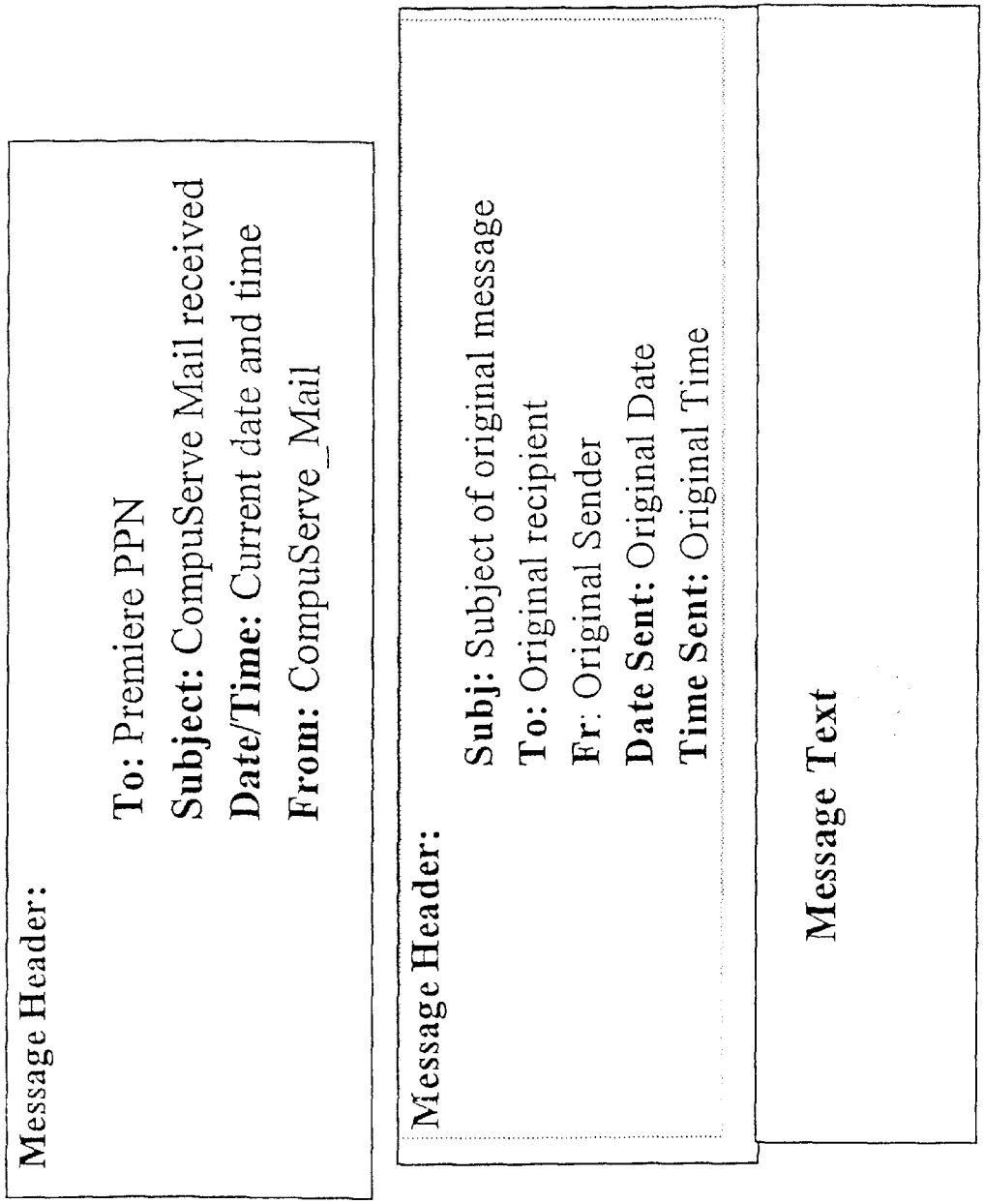
FIG. 16 is a diagrammatic representation of a common message format for a preferred embodiment of the present invention.

Referring to FIG. 16, a message format for messages exchanged between the computer access message repository and the telephone access repository is shown. The message may have an envelope 50 and a body 54. The envelope 50 may have a message header that includes several lines of text 60 identifying the service provider to which the message may be forwarded and other information regarding the source of the message. The body of the message 54 includes the message header 56 and message text 58 of the original message. The message header 56 of the body 54 identifies the original message receiver and the message sender.

The common message format facilitates the exchange of messages in accordance with various communications media so that messages may be retrieved from the universal mailbox. The common format is based on known e-mail formats so that messages may be forwarded from the computer access message repository to the telephone access message repository using standard e-mail protocols. Using this approach, the telephone access service appears to the computer access service to be another member of the service to whom messages may be forwarded. The telephone access service may accept all types of messages, including multi-part and binary messages, that the computer access service is capable of processing. Consequently, e-mail messages may arrive at the telephone access service for reformatting/conversion and distribution to voice mail mailboxes for later retrieval by subscribers.

Using the common message format approach, the telephone access service appears to the computer access service to be a service from which e-mail messages also may be received. Voice mail messages that originate at the telephone access service may be forwarded to the computer access service in accordance with an e-mail message that has an attached audio file containing the original voice mail message. Computer users may then use their connection software to retrieve e-mail messages including those e-mail messages associated with audio files. The connection software, which is equipped with an audio file player, may then, at the user's request, play the voice mail message for the computer user.

Referring again to FIG. 16, the From line 60 of the inbound message indicates to the receiving service provider (e.g., Premiere) the originating service provider (e.g., CompuServe) so that it may be processed in accordance with the present invention. For example, the receiving service provider may apply filter/forward rules according to the intended message receiver's preferences and perform any message translation that may be required (e.g., translate an e-mail message to a voice mail message format so that the message receiver may use the telephone to "listen" to the e-mail message.) Using this scheme, additional service providers and additional message repositories supporting different communication modes may be added easily to the network of message repositories that comprise the universal mailbox.

The common message format also facilitates the distribution of cross-media notifications. Notification or paging messages may be nearly identical to the original message except for the recipients. For the notification/paging message, the telephone access service (e.g., Premiere) address may be added as a copy recipient (i.e., a recipient of a copy of a message). The original message's recipient may be changed to indicate that the recipient is "non-responsible" so a second copy of the message is not delivered to the recipient as a result of sending the notification message. By leaving the original recipient on the notification message, the telephone access service knows who to notify or page. All other attributes of the message may remain the same.

In addition to personal and business communications, the present invention may be applied to many other types of communications such as news and other information accessible, for example, from on-line databases. Using the present invention, a message receiver may define filter and forward rules to be applied to headline, financial, sports, and other news retrieved from on-line databases. The news information may be formatted initially in an e-mail message that is then routed to a telephone access service provider for subsequent retrieval via the telephone.

Referring to FIG. 17, the telephone call flow for a preferred embodiment of the present invention is shown. Preferably, the caller is presented with a menu of options for retrieval of messages and administration of the universal mailbox. Menus may be nested so the selection of a particular option results in the presentation of additional options.

The present invention integrates communications by combining e-mail, voice mail, and fax mail in a universal mailbox. In a preferred embodiment, the universal mailbox allows users to access their messages in two ways. Using the present invention, messages senders may use a first medium for sending messages while message receivers may use a second communication medium for receiving messages. Messages may thus be received in a more timely and convenient manner because message receivers are no longer dependent upon accessing their messages using the communication mode of the sender. Forwarding and reformatting/conversion are performed automatically so message receivers may take advantage of the features of the present invention by selecting options to define rules to be applied to inbound messages. Senders may also select options to define rules to be applied to outbound messages.

Although the invention is described in detail with specific reference to a single preferred embodiment and certain alternatives, it is not limited to that particular embodiment or alternatives. For example, the configuration of the components that provide the features and functionality of the present invention may change and fall within the scope and spirit of the present invention. The scope of the present invention is defined by the following claims.

What is claimed is:

1. An electronic communications system comprising:
   means for sending messages in accordance with a first communication medium;
   means for defining a plurality of rules to apply to said messages, said rules defined by subscribers of an access service;
   means at said access service for automatically applying at least one of said plurality of rules to send a notification message in accordance with any communication medium, said means for applying adapted to apply said at least one of said plurality of rules upon the sending of at least one of said messages;
   means at said access service for applying at least one of said plurality of rules to convert at least one of said messages in accordance with said first communication medium to a message in accordance with a second communication medium, said means for applying adapted to apply said at least one of said plurality of rules upon receipt of said first communication medium;
   means at said access service for automatically applying at least one of said plurality of rules to send a notification message in accordance with any communication medium, said means for applying adapted to apply said at least one of said plurality of rules upon receipt of at least one of said messages;
   means for retrieving said converted message in accordance with said second communication medium; and
   means for responding immediately to said converted message by sending a reply message in accordance with a third communication medium.

2. The system of claim 1 wherein said first communication medium is selected from the group of voice mail, electronic mail, and fax mail.

3. The system of claim 1 wherein said second communication medium is selected from the group of voice mail, electronic mail, and fax mail.

4. The system of claim 1 wherein said plurality of rules are defined in accordance with filter and forward options applicable to said messages in accordance with said first communication medium.

5. The system of claim 4 further comprising immediate filter and forward options.

6. The system of claim 5 further comprising store and forward options.

7. The system of claim 1 wherein said plurality of rules comprise sender and receiver options.

8. The system of claim 1 wherein said rules are stored at and applied by an access service.

9. The system of claim 1 wherein said third communication medium is selected from the group of voice mail, electronic mail, and fax mail.

10. The system of claim 9 wherein the reply message is delivered to a recipient other than the sender of the converted message.

11. The system of claim 1 wherein said access service is selected from the group consisting of Internet Service Provider and telecommunications service provider.

12. A method for communicating electronically comprising the steps of:
    defining a plurality of rules to apply to messages in different communication media, said rules defined by, subscribers of an access service;
    composing and sending a plurality of messages in accordance with a first communication medium;
    applying at least one of said plurality of rules to send a notification message in accordance with any communication medium, said rule applied upon the sending of at least one of said messages at said access service;
    applying at least one of said plurality of rules to convert at least one of said messages in accordance with a first communication medium to a message in accordance with a second communication medium, said rule applied upon receipt of said at least one of said messages at said access service;
    applying at least one of said plurality of rules to send a notification message in accordance with any communication medium, said rule applied upon receipt of at least one of said messages at said access service;
    retrieving said converted message in accordance with said second communication medium; and
    at the option of the recipient of said converted message, responding immediately to said converted message by sending a reply message in accordance with a third communication medium.

13. The method of claim 12 wherein said first communication medium is selected from the group of electronic mail, voice mail, and fax mail.

14. The method of claim 12, wherein said second communication medium is selected from the group of electronic mail, voice mail, and fax mail.

15. The method of claim 12 wherein said plurality of rules comprise filter and forward options applicable to said messages in accordance with said first communication medium.

16. The method of claim 15 wherein said filter and forward options comprise immediate filter and forward options.

17. The method of claim 15 wherein said filter and forward options comprise store and forward options.

18. The method of claim 12 wherein said plurality of rules comprise sender and receiver options.

19. The method of claim 12 wherein said third communication medium is selected from the group of voice mail, electronic mail, and fax mail.

20. The method of claim 19 wherein the reply message is delivered to a recipient other than the sender of the converted message.

21. The system of claim 12 wherein said access service is selected from the group consisting of Internet Service Provider and telecommunications service provider.

22. A cross-media communication system comprising:

an access service for providing information services to a plurality of subscribers a graphical user interface for use by said subscribers to access and interact with said access service and to define rules to apply to messages sent from and received by said subscribers;

an electronic mail gateway for receiving from a telecommunications service voice mail and fax mail messages addressed to said subscribers of said access service said voice mail and fax mail messages received from said telecommunications service in accordance with said rules applied to said voice mail and tax messages upon receipt at said telecommunications service;

means at said access service for automatically applying at least one of said rules to send a notification message in accordance with any communication medium, said means for applying adapted to apply said at least one of said rules upon the sending of at least one of said voice mail and fax mail messages;

means at said access service for automatically applying at least one of said rules to send a notification message in accordance with any communication medium, said means for applying adapted to apply said at least one of said rules upon receipt of at least one of said voice mail and fax mail messages;

an audio player for playing said voice mail messages, said audio player accessible from said graphical user interface;

a fax viewer for viewing said fax messages, said fax viewer accessible from said graphical user interface; and a means for immediately responding to said voice mail messages and said fax messages, via voice mail, electronic mail, or fax.

23. The system of claim 22 wherein said rules comprise cross-media notification rules.

24. The system of claim 22 wherein said electronic, voice, and fax mail messages are delivered in accordance with said rules.

25. The system of claim 22 wherein said telecommunications service forwards inbound voice mail and fax mail messages to an information service mailbox.

26. The system of claim 22, further comprising a means for notifying said subscribers when voice mail and fax mail messages addressed to them have been received from said telecommunications service, by sending alerts to any e-mail address, pager, or fax machine of said subscribers.

27. An information access service for rendering voice mail messages accessible to a plurality of subscribers of said access service, said service comprising:

an electronic mail gateway for receiving electronic mail messages from a telecommunications service, mail messages comprising audio files with voice mail messages originating from said telecommunications service and said electronic mail messages received from said telecommunications service in accordance with rules defined by a subscriber applied to said voice mail messages upon receipt at said telecommunications service;

means at said access service for automatically applying at least one of said rules to send a notification message in accordance with; any communication medium, said means for applying adapted to apply said at least one of said rules upon the sending of at least one of said voice mail and fax mail messages;

means at said access service for automatically applying at least one of said rules to send a notification message in accordance with any communication medium, said means for applying adapted to apply said at least one of said rules upon receipt of at least one of said voice mail and fax mail messages; and connection software for use by said subscribers to establish a connection to said information access service, to retrieve said electronic mail messages, to play said audio files, and to respond immediately to said electronic mail messages.

28. An information access service for rendering fax mail messages accessible to a plurality of subscribers of said service, said service comprising:

an electronic mail gateway for receiving electronic mail messages from a telecommunications service, said electronic mail messages comprising files with fax mail messages originating from said telecommunications service and said electronic mall messages received from said telecommunications service in accordance with rules defined by a subscriber applied to said fax mail messages upon receipt at said telecommunications service;

means at said access service for automatically applying at least one of said rules to send a notification message in accordance with any communication medium, said means for applying adapted to apply said at least one of said rules upon the sending of at least one of said electronic mail messages;

means at said access service for automatically applying at least one of said rules to send a notification message in accordance with any communication medium, said means for applying adapted to apply said at least one of said rules upon receipt of at least one of said electronic mail messages; and connection software for use by said subscribers to establish a connection to said information access service, to retrieve said electronic mail messages, to view said fax mail message files, and to respond immediately to said fax mail messages via electronic mail or fax.

29. A method of providing integrated telecommunications services to a plurality of subscribers of an access service, comprising:

providing a plurality of communications lines, the communications lines assigned to the plurality of subscribers;

defining a plurality of rules to apply to fax messages, the rules defined by the access service subscribers;

assigning mailboxes at the access service to the plurality of subscribers;

applying one of said plurality of rules to send a notification message in accordance with any communication medium the rule applied upon the sending of a fax message intended for an access service subscriber;

receiving the fax message at the access service;

applying one of said plurality of rules to send a notification message in accordance with any communication medium, the rule applied upon receipt of the fax message at the access service;

applying one of said plurality of rules to convert the fax message to a data file the rule applied upon receipt of the fax message at the access service;

storing the data file in the mailbox assigned to the access service subscriber for later retrieval by the subscriber; and providing the access service subscriber with the capability to respond immediately to the fax message upon such later retrieval.

30. The method of claim 29, further comprising:
providing the capability for the subscriber to retrieve the data file by dialing in with a telephone.

31. A method of providing integrated telecommunications services to a plurality of subscribers of an access service, comprising:
defining a plurality of rules to apply to fax messages, the rules defined by the access service subscribers;
applying one of said plurality of rules to send a notification message in accordance with any communication medium, the rule applied upon the sending of a fax message intended for an access service subscriber;
receiving the fax message at the access service;
applying one of said plurality of rules to send a notification message in accordance with any communication medium, the rule applied upon receipt of the fax message at the access service;
applying one of said plurality of rules to convert the fax message to a data file, the rule applied upon receipt of the fax message at the access service;
providing the capability for the access service subscriber to retrieve the data file by dialing in with a telephone; and
providing the access service subscriber with the capability to respond immediately to the fax message upon such retrieval.

32. A method of providing integrated telecommunications services to a plurality of subscribers of an access service, comprising:
defining a plurality of rules to apply to fax messages, the rules defined by the access service subscribers;
applying one of said plurality of rules to send a notification message in accordance with any communication medium, the rule applied upon the sending of a fax message intended for an access service subscriber;
receiving the fax message at the access service;
applying one of said plurality of rules to send a notification message in accordance with any communication medium, the rule applied upon receipt of the fax message at the access service;
applying one of said plurality of rules to convert the fax message to a data file, the rule applied upon receipt of the fax message at the access service;
sending the data file to the access service subscriber via email; and
providing the access-service subscriber with the capability to respond immediately to the fax message upon receiving the data file.

33. A method of providing integrated telecommunications services to a plurality of subscribers of an access service, comprising:
defining a plurality of rules to apply to fax messages, the rules defined by the access service subscribers;
applying one of said plurality of rules to send a notification message in accordance with any communication medium, the rule applied upon the sending of a fax message intended for an access service subscriber;
receiving the fax message at the access service;
applying one of said plurality of rules to send a notification message in accordance with any communication medium, the rule applied upon receipt of the fax message at the access service;
applying one of said plurality of rules to convert the fax message to a data file, the rule applied upon receipt of the fax message at the access service;
downloading the data file to the access service subscribers computer access message repository box for later retrieval by the access service subscriber in a subscriber-selected media; and
providing the access service subscriber with the capability to respond immediately to the fax upon such later retrieval.

34. The method of claim 33, further comprising:
receiving an audio file attached to the fax message; and
downloading the audio file to the access service subscriber's computer access message repository box.

35. The method of claim 33, further comprising:
receiving an audio file attached to the fax message; and
sending the data file and the audio file to the access service subscriber via email.

36. The method of claim 33, wherein the access service subscriber's computer access message repository box is located at an Internet Service Provider which provides Internet access to the access service subscriber.

37. The method of claim 33, wherein the notification message comprises an alert to a telephone that a fax message is waiting at the computer access message repository box.

38. The method of claim 33, wherein the notification message comprises an alert to a pager that a fax message is waiting at the computer access message repository box.

39. The method of claim 33, wherein the notification message comprises an alert to the access service subscriber via email that a fax message is waiting at the computer access message repository box.

40. The method of claim 33, further comprising:
redirecting the fax message to an alternate fax number.

41. A method of providing integrated telecommunications services to a plurality of subscribers of an access service, comprising:
defining a plurality of rules to apply to fax messages, the rules defined by the access service subscribers;
applying one of said plurality of rules to send a notification message in accordance with any communication medium, the rule applied upon the sending of a fax message intended for an access service subscriber;
receiving the fax message at the access service;
applying one of said plurality of rules to send a notification message in accordance with any communication medium, the rule applied upon receipt of the fax message at the access service;
providing the access service subscriber with the capability to annotate the data file with an audio file; and
providing the subscriber with the capability to respond immediately to the fax upon receiving the fax.

42. The method of claim 41, further comprising:
applying a rule to convert the fax message to a data file, the rule applied upon receipt of the fax message at the access service; and
sending the data file and the audio file to any specified fax number.

43. The method of claim 41, further comprising:
sending the fax message and the audio file to any specified fax number.

44. A method of providing integrated telecommunications services to a plurality of subscribers of an access service, each subscriber having a universal mailbox at the access service, comprising:

providing the capability of defining a set of rules by an access service subscriber to handle received fax messages;

applying the set of rules to send a notification message in accordance with any communication medium, the rules applied upon the sending of a fax message intended for the access service subscriber;

receiving the fax message at the access service;

applying the set of rules to send a notification message in accordance with any communication medium, the rules applied upon receipt of the fax message at the access service;

applying the set of rules to the fax message the rules applied upon receipt of the fax message at the access service; and providing the access service subscriber with the capability to respond immediately to the fax message upon receiving the fax message.

45. The method of claim 44, wherein the set of rules includes storing the fax message in the access service subscriber's universal mailbox.

46. The method of claim 45, wherein the set of rules includes:

applying the set of rules to convert the fax message to a fax data file; and downloading the fax data file to the access service subscriber's universal mailbox.

47. The method of claim 45, wherein the set of rules includes forwarding the fax message to a specified fax number.

48. The method of claim 44, wherein the notification message comprises an alert to the access service subscriber via email that a fax message is waiting at the subscriber's universal mailbox.

49. The method of claim 44, wherein the notification message comprises an alert to the subscriber's pager that a fax message is waiting at the access service subscriber's universal mailbox.

50. The method of claim 45, wherein the set of rules includes converting any attached voice mail into an audio file.

51. The method of claim 44, wherein the providing step includes providing the capability to the access service subscriber via a client software application program.

52. The method of claim 51, wherein the client software application program is a web browser.

53. The method of claim 44, wherein the providing step includes providing the capability to the access service subscriber via telephone.

54. A method of providing integrated data services to a plurality of subscribers of an access service, comprising:

defining a plurality of rules to apply to email, the rules defined by the access service subscribers;

applying one of said plurality of rules to send a notification message in accordance with any communication medium, the rule applied upon the sending of an email message intended for an access service subscriber;

receiving the email at the access service;

applying one of said plurality of rules to send a notification message in accordance with any communication medium, the rule applied upon receipt of the email at the access service;

applying a rule to convert the email to an audio file using text-to-speech conversion, the rule applied upon receipt of the email at the access service, and providing the access service subscriber with the capability to respond immediately to the email upon receiving the audio file.

55. The method of claim 54, further comprising:

storing the audio file in a mailbox associated with the access service subscriber for later retrieval.

56. The method of claim 54, wherein the step of applying a rule to convert the email occurs immediately after the email is received at the access service.

57. The method of claim 54, wherein the step of applying a rule to convert the email occurs when a conversion request is received.

58. The method of claim 57, wherein the conversion request is received via a telephone line.

59. The method of claim 57, wherein the conversion request is received via a web browser.

60. The method of claim 54, further comprising:

providing the capability to listen to the audio file.

61. A method of providing integrated telecommunications services to a plurality of subscribers of an access service, each subscriber having a universal mailbox at the access service, comprising:

providing the capability of defining a set of rules by an access service subscriber to handle received voice messages;

applying the set of rules to send a notification message in accordance with any communication medium, the rules applied upon the sending of a voice message intended for the access service subscriber;

receiving the voice message at the access service;

applying the set of rules to send a notification message in accordance with any communication medium, the rules applied upon receipt of the voice message at the access service;

applying the set of rules to the voice message, the rules applied upon receipt of the voice message at the access service; and providing the access service subscriber with the capability to respond immediately to the voice message via email, fax, or pager number upon receiving the voice message.

62. The method of claim 61, wherein the set of rules includes storing the voice message in the access service subscriber's universal mailbox.

63. The method of claim 61, wherein the set of rules includes:

converting the voice message into a text data file; and downloading the text data file to the access service subscriber's universal mailbox.

64. The method of claim 63, wherein the set of rules includes sending the text data file to a specified fax number.

65. The method of claim 64, wherein the set of rules includes sending the text data file to a specified email address.

66. The method of claim 61, wherein the set of rules includes converting the voice message into an audio file.

67. The method of claim 66, further comprising:

sending the audio file to the access service subscriber's universal mailbox.

68. The method of claim 66, further comprising:

sending the audio file to the access service subscriber's email address.

69. The method of claim 61, wherein the notification message comprises an alert to the access service subscriber via email that a voice message is waiting at the access service subscriber's universal mailbox.

70. The method of claim 61, wherein the notification message comprises an alert to the access service subscriber's pager that a voice message is waiting at the access service subscriber's universal mailbox.

71. The method of claim 61, wherein the providing step includes providing the capability to the access service subscriber via a client software application program.

72. The method of claim 71, wherein the client software application program is a web browser.

73. The method of claim 61, wherein the providing the capability of defining step includes providing such capability to the access service subscriber via telephone.

74. A method of providing integrated telecommunications services to a plurality of subscribers of an access service, each subscriber having a universal mailbox at the access service, comprising:

providing the capability of defining a set of rules by an access service subscriber to handle received voice mail messages;

applying the set of rules to send a notification message in accordance with any communication medium, the rules applied upon the sending of a voice mail message from a caller and intended for the access service subscriber;

receiving the voice mail message at the access service;

applying the set of rules to send a notification message in accordance with any communication medium, the rules applied upon receipt of the voice mail message at the access service;

applying the set of rules to convert the voice mail message into an audio file, the rules applied upon receipt of the voice mail message at the access service;

downloading the audio file to the access service subscribers universal mailbox; and providing the access service'subscriber with the capability to respond immediately to the voice mail via email, fax, or pager number upon receiving the voice mail.

75. The method of claim 74, further comprising:
sending the audio file to the access service subscriber upon demand by the access service subscriber.

76. The method of claim 75, further comprising:
sending the audio file to the access service subscriber via an email.

77. The method of claim 75, wherein the notification message comprises an email to the access service, subscriber to alert the access service subscriber that the voice mail message is waiting at the access service subscribers universal mailbox at the access service.

78. The method of claim 74, wherein the notification message comprises an alert to a pager that the voice mail is waiting at the access service subscriber's universal mailbox at the access service.

79. The method of claim 74, wherein the notification message comprises an alert to a telephone that the voice mail is waiting at the access service subscriber's universal mailbox at the access service.

80. The method of claim 74, wherein the notification message comprises an alert to a fax telephone number that the voice mail message is waiting at the access service subscriber's universal mailbox at the access service.

81. A method of providing integrated telecommunications services to a plurality of subscribers of an access service, each access service'subscriber having a universal mailbox at the access service, comprising:

providing the capability of defining a set of rules by an access service subscriber to handle received voice mail messages;

applying the set of rules to send a notification message in accordance with any communication medium, the rules applied upon the sending of voice mail message from a caller and intended for the access service subscriber;

receiving the voice mail message at the access service;

applying the set of rules to send a notification message in accordance with any communication medium, the rules applied upon receipt of the voice mail message at the access service;

applying the set of rules to convert the voice mail message into a text file using speech-to-text conversion, the rules applied upon receipt of the voice mail message at the access service;

downloading the text file to the access service subscriber's universal mailbox at the access service; and providing the access service subscriber with the capability to respond immediately to the voice mail message via email, fax, pager number upon receiving the voice mail message.

82. The method of claim 81, further comprising:
sending the text file as an email to the access service subscriber.

83. The method of claim 81, further comprising:
sending the text file as a fax message to any fax number.

84. A method providing notification of the receipt of a message for a plurality of subscribers of an access service, each subscriber having a mailbox at the access service, comprising:

defining a plurality of rules to apply to said message said rules defined by the access service subscriber;

receiving an email intended for the access service subscriber;

storing the email in the access service subscriber's mailbox at the access service;

applying one of said plurality of rules to send an alert to the access service subscriber via pager, fax, or telephone to notify the access service subscriber that the email has been received; and providing the access service subscriber with the capability of responding immediately to the email via voice message, email, or fax message.

85. A method of providing notification of the receipt of a message for a plurality of subscribers of an access service, each subscriber having a mailbox at the access service, comprising:

defining a plurality of rules to apply to said message, said rules defined by the access service subscriber;

receiving an email intended for the access service subscriber;

storing the email in the access service subscriber's mailbox at the access service; and applying one of said plurality of rules to send a trigger to an alerting mechanism via email, fax message or telephone so that the alerting mechanism can send an alert to the access service subscriber to notify the access service subscriber that the email has been received.

86. A method of providing notification of the receipt of a message for a plurality of subscribers of an access service, each subscriber having a mailbox at the access service, comprising:

defining a plurality of rules to apply to said message, said rule defined by the access service subscriber;

receiving a fax message intended for the access service subscriber;

storing the fax message in the access service subscriber's mailbox at the access service; and applying one of said plurality of rules to send an alert to the access service subscriber via voice message, email, or fax message to notify the access service subscriber that the fax message has been received.

87. A method of providing notification of the receipt of a message for a plurality of subscribers of an access service, each subscriber having a mailbox at the access service, comprising:

defining a plurality of rules to apply to said message, said rules defined by the access service subscriber;

receiving a fax message intended for the access service subscriber;

storing the fax message in the access service subscriber's mailbox at the access service; and applying one of said plurality of rules to send a trigger to an alerting mechanism via email, fax message, or telephone so that the alerting mechanism can send an alert to the access service subscriber to notify the access service subscriber that the fax message has been received.

88. A method of providing notification of the receipt of a message for a plurality of subscribers of an access service, each subscriber having a mailbox at the access service, comprising:

defining a plurality of rules to apply to said message, said rules defined by the access service subscriber;

receiving a voice mail message intended for the access service subscriber;

storing the voice mail message in the access service subscriber's mailbox at the access service; and applying one of said plurality of rules to send an alert to the access service subscriber via email, fax message, or telephone to notify the access service subscriber that the voice mail message has been received.

89. A method of providing notification of the receipt of a message for a plurality of subscribers of an access service each subscriber having a mail access service, comprising:

defining a plurality of rules to apply to said message said rules defined by the access service subscriber;

receiving a voice mail message intended for the access service subscriber;

storing the voice mail message in the access service subscriber's mailbox at the access service; and applying one of said plurality of rules to'send a trigger to an alerting mechanism via email, fax message, or telephone so that the alerting mechanism can send an alert to the access service subscriber to notify the access service subscriber that the voice mail message has been received.

* * * * *

UNITED STATES PATENT AND TRADEMARK OFFICE
CERTIFICATE OF CORRECTION

PATENT NO. : 6,633,630 B1
DATED : October 14, 2003
INVENTOR(S) : Owens et al.

It is certified that error appears in the above-identified patent and that said Letters Patent is hereby corrected as shown below:

Column 3,
Line 37, please delete "different-physical" and insert -- different physical --.

Column 11,
Line 58, please delete "-a" and insert -- a --.

Column 12,
Lines 24 and 25, please delete "(e.g., "You have received a message fromwith subject.")" and insert -- (e.g., "You have received a message from _____ with subject _____.") --.

Column 19,
Line 3, please delete "subscribers" and insert -- subscribers; --.
Line 10, please delete "access service said" and insert -- access service, said --.
Line 13, please delete "tax" and insert -- fax --.
Line 54, please delete "service, mail" and insert -- service, said electronic mail --.
Line 64, pleaes delete "with: any" and insert -- with any --.

Column 20,
Line 19, please delete "mall" and insert -- mail --.
Line 54, please delete "medium the" and insert -- medium, the --.
Line 63, please delete "file the" and insert -- file, the --.

Column 21,
Line 51, please delete "access-service" and insert -- access service --.

Column 22,
Line 4, please delete "subscribers" and insert -- subscriber's --.

Column 23,
Line 14, please delete "message the" and insert -- message, the --.
Line 67, please delete "service, and" and insert -- service; and --.

Column 25,
Lines 33, 34 and 47, pleaes delete "subscribers" and insert -- subscriber's --.
Line 45, please delete "service, subscriber" and insert -- service subscriber --.
Line 63, please delete "service' subscriber" and insert -- service subscriber --.

UNITED STATES PATENT AND TRADEMARK OFFICE
CERTIFICATE OF CORRECTION

PATENT NO. : 6,633,630 B1
DATED : October 14, 2003
INVENTOR(S) : Owens et al.

It is certified that error appears in the above-identified patent and that said Letters Patent is hereby corrected as shown below:

Column 26,
Line 19, please delete "fax, pager" and insert -- fax, or pager --.
Line 31, please delete "message said" and insert -- message, said --.
Line 65, please delete "rule" and insert -- rules --.

Column 28,
Line 11, please delete "service" and insert -- service, --.
Line 14, please delete "message said" and insert -- message, said --.
Line 22, please delete "to' send" and insert -- to send --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,633,630 B1
DATED         : October 14, 2003
INVENTOR(S)   : Owens et al.

It is certified that error appears in the above-identified patent and that said Letters Patent is hereby corrected as shown below:

Title page,
Item [75], Inventors, the Inventors should read as follows:
-- Stephen J.H. Owens, Dublin, OH (US); James Arthur Kitchen, Atlanta, GA (US); David Gregory Smith, Tampa, FL (US); Leonard A. DeNittis, Atlanta, GA (US); Kyle S. Brown, Santa Rosa, CA (US); Michael S. Finney, Hilliard, OH (US); Thomas Francis Johnson, III, Atlanta, GA (US); Steve Feinstein, Atlanta, GA (US); Michael L. Snider, Columbus, OH (US); Randall S. Wright, Worthington, OH (US), James W. Paynter, Hilliard, OH (US); Robin R. Bard, Dublin, OH (US) --.
Item [56], References Cited, insert:

-- U.S. PATENT DOCUMENTS

| | | | |
|---|---|---|---|
| -- 4,531,184 | 07/1985 | Wigan et al. | 364/200 |
| 4,951,196 | 08/1990 | Jackson | 705/37 |
| 5,088,032 | 02/1992 | Bosack | 395/200 |
| 5,263,157 | 11/1993 | Janis | 395/600 |
| 5,276,869 | 01/1994 | Forrest et al. | 395/600 |
| 5,283,856 | 02/1994 | Gross et al. | 395/51 |
| 5,317,568 | 05/1994 | Bixby et al. | 370/85.6 |
| 5,438,611 | 08/1995 | Campana, Jr. et al. | 379/58 |
| 5,483,580 | 01/1996 | Brandman et al. | 379/88 |
| 5,497,373 | 03/1996 | Hulen et al. | 370/79 |
| 5,555,346 | 09/1996 | Gross et al. | 395/51 |
| 5,606,668 | 02/1997 | Shwed | 380/42 |
| 5,608,874 | 03/1997 | Ogawa et al. | 395/200.76 |
| 5,619,648 | 04/1997 | Canale et al. | 395/200.36 |
| 5,621,727 | 04/1997 | Vaudreuil | 370/60 |
| 5,742,668 | 04/1998 | Pepe et al. | 455/415 |
| 5,758,088 | 05/1998 | Bezaire et al. | 395/200.62 |
| 5,765,170 | 06/1998 | Morikawa | 707/200 -- |

UNITED STATES PATENT AND TRADEMARK OFFICE
CERTIFICATE OF CORRECTION

PATENT NO. : 6,633,630 B1
DATED : October 14, 2003
INVENTOR(S) : Owens et al.

It is certified that error appears in the above-identified patent and that said Letters Patent is hereby corrected as shown below:

Title page (cont'd),
Item [56], References Cited, please insert the following references:
-- FOREIGN PATENT DOCUMENTS
EP 0597691 A1 11/1992 Chamberlain et al.
OTHER PUBLICATIONS
C.J. Barter, "Transaction Processing in Message Passing Systems," Proceedings of the 6th Australian Computer Science Conference, Sydney, NSW, Australia, February 10-12, 1983, pp. 177-186. --.
Item [22], Filed:, please delete "Filed: Sep. 12, 1998" and insert
-- Filed: Sep. 21, 1998 --.

Column 1,
Line 37, please delete "required use" and insert -- required to use --.

Signed and Sealed this

Fourteenth Day of September, 2004

JON W. DUDAS
*Director of the United States Patent and Trademark Office*